United States Patent
Mo et al.

(10) Patent No.: US 10,990,256 B2
(45) Date of Patent: Apr. 27, 2021

(54) MODIFYING DEFAULT DISPLAY CONFIGURATIONS FOR OBJECTS IN A USER INTERFACE

(71) Applicant: salesforce.com, inc., San Francisco, CA (US)

(72) Inventors: Brian Mo, Palo Alto, CA (US); Patrice Pominville, San Francisco, CA (US); Yi Chen, Oakland, CA (US); Yenan Chen, Burlingame, CA (US); Yoshita Tibrewal, San Francisco, CA (US); Brian Luc, Los Altos, CA (US)

(73) Assignee: salesforce.com, inc., San Francisco, CA (US)

( * ) Notice: Subject to any disclaimer, the term of this patent is extended or adjusted under 35 U.S.C. 154(b) by 20 days.

(21) Appl. No.: 16/129,472

(22) Filed: Sep. 12, 2018

(65) Prior Publication Data
US 2020/0081606 A1    Mar. 12, 2020

(51) Int. Cl.
*G06F 3/0484* (2013.01)
*G06F 3/0481* (2013.01)

(52) U.S. Cl.
CPC ........ *G06F 3/04842* (2013.01); *G06F 3/0481* (2013.01); *G06F 3/04845* (2013.01); *G06F 2203/04806* (2013.01)

(58) Field of Classification Search
CPC . G06F 3/0481; G06F 3/04842; G06F 3/04845
See application file for complete search history.

(56) References Cited

U.S. PATENT DOCUMENTS

| | | | |
|---|---|---|---|
| 2007/0113175 A1* | 5/2007 | Iwasaki | G06F 40/14 715/246 |
| 2012/0176402 A1* | 7/2012 | Kim | G06T 17/00 345/619 |
| 2013/0275864 A1* | 10/2013 | William | G06F 40/163 715/244 |
| 2019/0114308 A1* | 4/2019 | Hancock | G06F 40/106 |

* cited by examiner

*Primary Examiner* — Sherrod L Keaton
(74) *Attorney, Agent, or Firm* — Holland & Hart LLP

(57) ABSTRACT

Methods, systems, and devices for modifying default display configurations for objects in a user interface are described. A system may support automatically drawing objects in a user interface such that the objects do not overlap and are legible to a user. To draw the objects with no overlaps, the system may determine when objects overlap based on a sweep procedure that identifies locations of default positions for each object to be displayed in the user interface. If two objects are identified to overlap in both a first and a second dimension during the sweep procedure, the system may modify one of the objects to prevent the overlap. For example, the system may hide the object or may find a next best location to draw the object such that the objects no longer overlap. Performing the sweep procedure may reduce latency and processing resources needed to identify any overlapping objects.

18 Claims, 19 Drawing Sheets

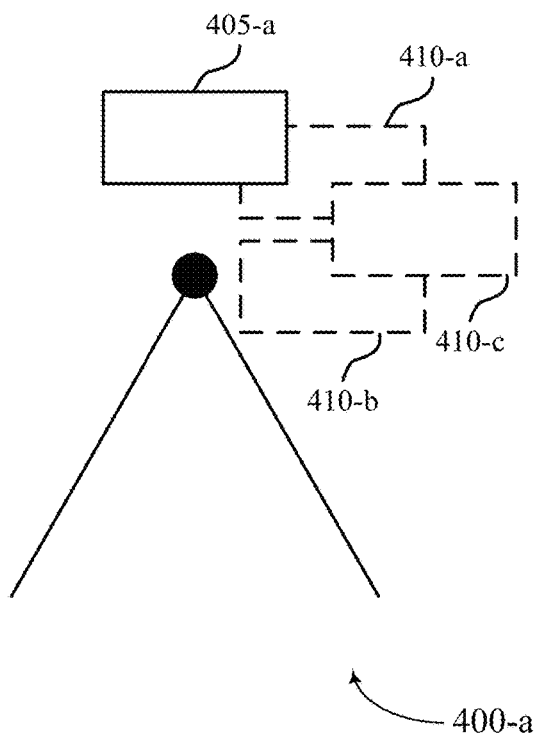
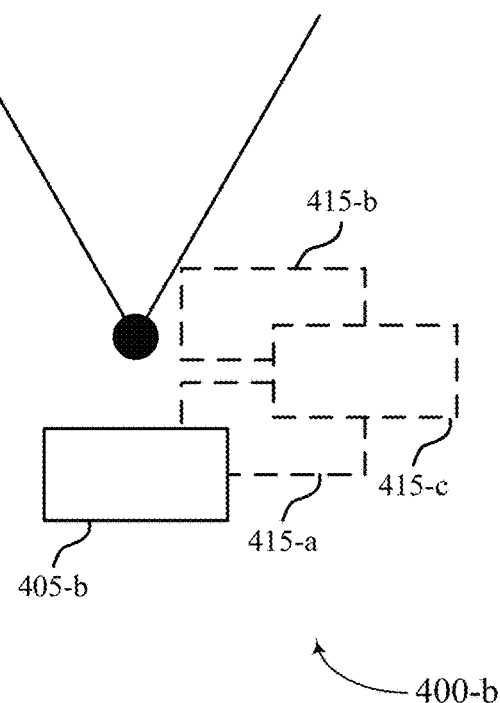
FIG. 4A
FIG. 4B
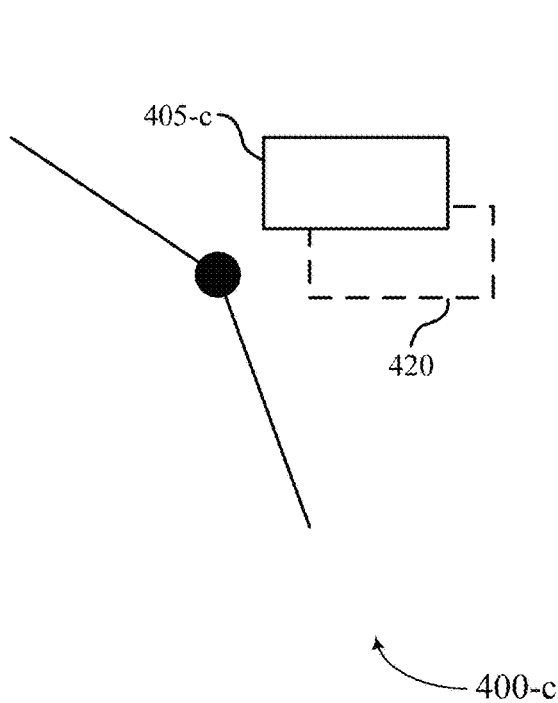
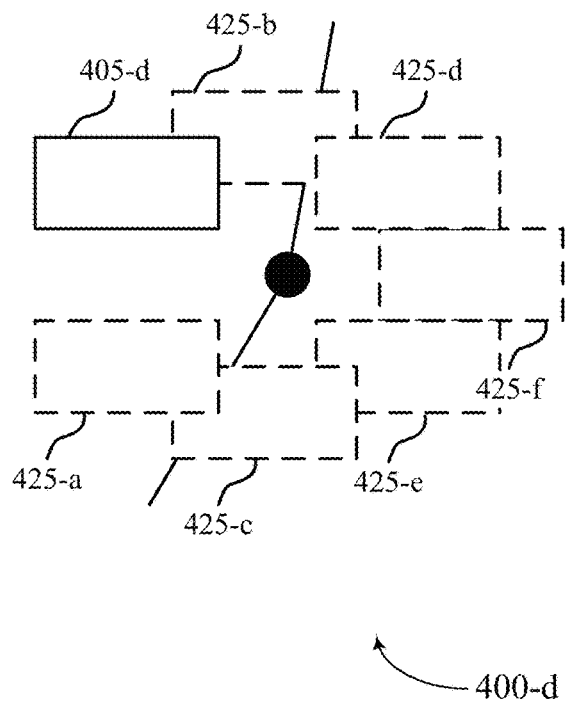
FIG. 4C
FIG. 4D

MODIFYING DEFAULT DISPLAY CONFIGURATIONS FOR OBJECTS IN A USER INTERFACE

FIELD OF TECHNOLOGY

The present disclosure relates generally to database systems and data processing, and more specifically to modifying default display configurations for objects in a user interface.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

When a user requests data from the cloud platform, the data may be displayed to the user via a chart (e.g., a line chart with associated data points, a pie chart, a bar chart, etc.). The chart may include multiple data points within the chart. For example, the chart may include total sales amounts per quarter for a company and/or total sales per region for the company. A default display configuration for the chart may include labels for these data points displayed in a user interface, where some of the displayed labels overlap in the user interface. This may result in the user having difficulties reading the overlapping labels for the chart. If the user manually repositions the labels in the chart for improved readability, modifying the size of the user interface may once again result in overlapping of the labels despite the manual repositioning (e.g., viewing the chart on a different user device with a different screen size, shrinking or expanding the chart in the user interface, etc.). Additionally or alternatively, if the data dynamically updates (e.g., for daily sales information updating periodically each day), the shape of the chart may dynamically change, re-positioning labels and once again resulting in label overlap. Accordingly, efficient techniques are desired for dynamically determining placement of data labels in a corresponding chart.

BRIEF DESCRIPTION OF THE DRAWINGS

FIGS. 4A-4D illustrate examples of object positions that support modifying default display configurations for objects in a user interface in accordance with aspects of the present disclosure.

DETAILED DESCRIPTION

Figure 1:
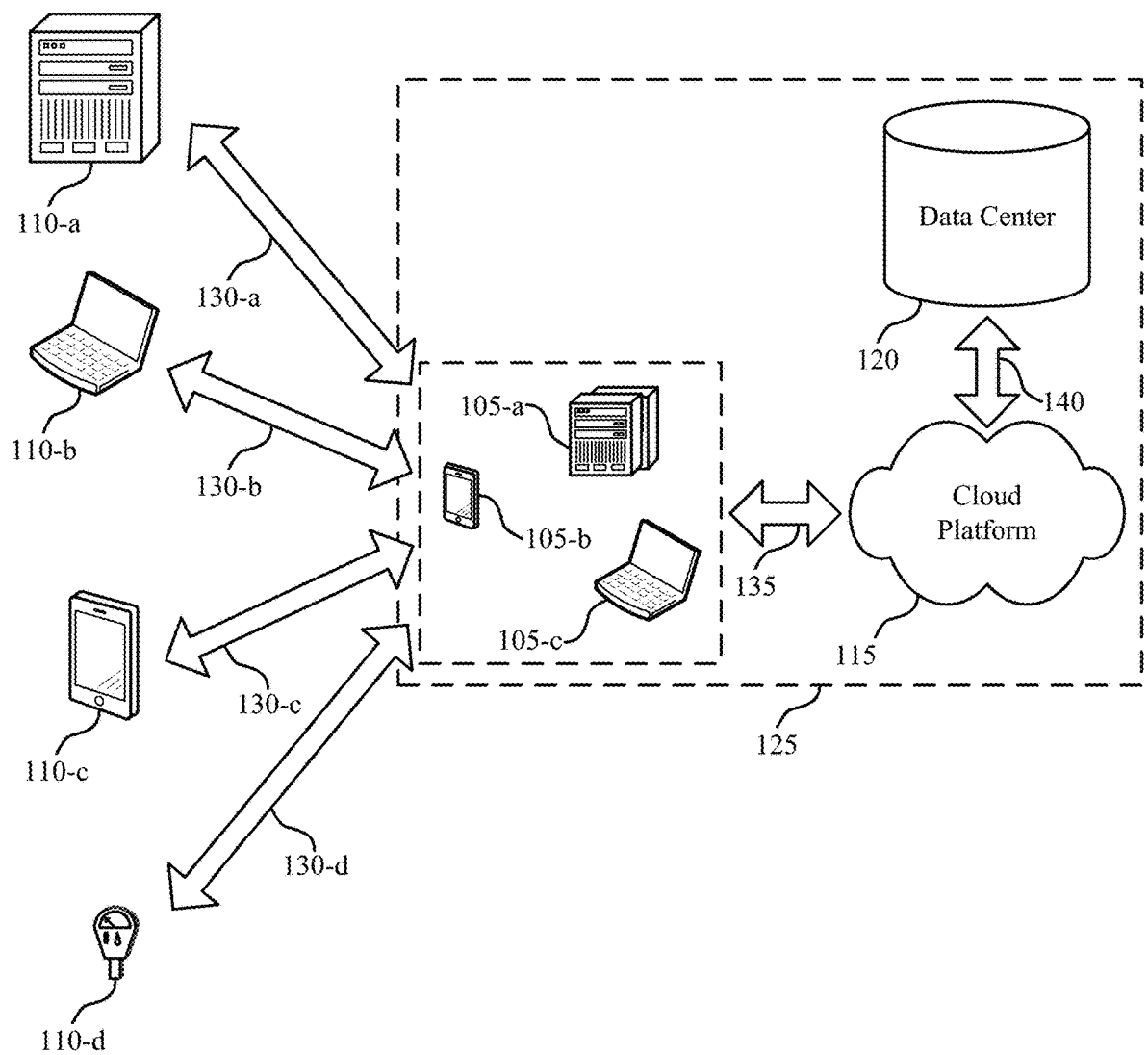
FIG. 1 illustrates an example of a system for automatically modifying how a set of objects is displayed in a user interface that supports modifying default display configurations for the objects in the user interface in accordance with aspects of the present disclosure.

In some systems, users may utilize user devices to view datasets. In some cases, these datasets may be related to customer relationship management (CRM) information, or to any other type of information of interest to the user. User devices may have limited space to display objects (e.g., data labels) in a user interface (e.g., a graph). Many parameters may affect the resources available for a user device to display data, including but not limited to the screen size of the user device, the screen resolution, a minimum object size for display, a number of applications to display simultaneously, or any combination of these factors. In some cases, based on the limited resources for displaying information, the displayed objects may overlap in the user interface, making it very difficult for a user to view or read what is being displayed. For example, a graph may include hundreds or thousands of data points with corresponding data labels, and the default locations of these data labels may overlap. Additionally, resizing the display or updating the displayed data may change which objects overlap in real-time. In these cases, an efficient system for identifying and handling overlapping objects in a user interface is desired.

To efficiently identify overlapping objects, the system may implement a "sweep" procedure. The sweep may progress across a first dimension (e.g., the x-dimension), identifying the starting and ending coordinates for each data object at each increment in the sweep. When the sweep encounters a starting coordinate in the first dimension for an object, the system stores an interval in a second dimension (e.g., the y-dimension) corresponding to the object. The system may remove this interval from storage upon encountering the ending coordinate in the first dimension for the object. By implementing the "sweep" procedure, the system may reduce the problem of identifying overlapping objects from a two-dimensional orthogonal rectangle intersection search to a one-dimensional interval search at each incremental step of the sweep. Such a reduction in complexity may greatly improve the latency and processing resources used to identify overlapping objects in the user interface.

During the sweep procedure, in some cases, the system may encounter a start coordinate in the first dimension for a second object before reaching the ending coordinate for a first object. If the system identifies that the interval in the second dimension for the second object overlaps with the stored interval for the first object, the system determines that these two objects overlap in the display (e.g., the system knows that they overlap in the x-dimension based on the sweep and that they overlap in the y-dimension based on the overlapping intervals). The system may not draw the second object, and instead may modify how the second object is displayed based on identifying the overlap. For example, in a first option, the system may hide or not draw (e.g., display) the second object in the user interface. In a second option, the system may search for a next best location for the second object, which may correspond to a different start coordinate, a different end coordinate, a different interval, or some combination of these. If the next best location for the second object falls outside of the user interface, the system may further adjust the positioning of the second object such that it is located within the user interface and does not overlap any other objects.

In some cases, the next best location for the second object may overlap with a next occurring object in the sweep procedure. For example, the next best location for the second object and a position for a third object may partially occupy the same space in the user interface. As such, since the second object was identified according to the sweep procedure prior to identifying the third object, the second object may take precedence and be displayed. The system may then determine how to modify the third object as described above (e.g., hide the third object, select a new position for the third object, etc.). By making hard decisions on object positioning in the direction of the sweep (e.g., determining how to display objects from left to right if the sweep progresses from left to right), the system may perform a single sweep procedure to determine how to display all of the objects in the user interface.

Additionally, the user interface may be resized based on a user preference (e.g., a user may prefer a larger or smaller size for the user interface), based on the user device displaying the user interface (e.g., different user devices may have different display sizes, for example, based on screen size), or based on a similar resizing need. Accordingly, the system may recalculate positions and/or display configurations for each object based on the resizing. The system may further perform a worst-case scenario calculation based on the resized user interface to determine if there is enough space for all the objects to be displayed in the user interface in the first and second dimensions assuming a minimum size (e.g., one character) for each object. If it is determined that there is not enough room, the system may refrain from drawing any of the objects in the user interface. If it is determined that there is enough room, the system may then initiate the sweeping procedure.

By using the sweeping procedure, the system may improve the performance and reduce the latency involved in determining overlapping objects. This may allow the system to modify the display of objects in real-time (e.g., in response to a user resizing a graph or in response to updates to the underlying data for the graph).

Aspects of the disclosure are initially described in the context of an environment supporting an on-demand database service. A system depicting a user interface, examples of sweeping procedures, object positions, an object movement procedure, and a user interface resizing are then provided to demonstrate additional aspects of the disclosure. Aspects of the disclosure are further illustrated by and described with reference to apparatus diagrams, system diagrams, and flowcharts that relate to modifying default display configurations for objects in a user interface.

FIG. 1 illustrates an example of a system 100 for cloud computing that supports modifying default display configurations for objects in a user interface in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a contact 110 may receive data (e.g., dynamic data) from a cloud client 105, and the contact 110 may display the data within a user interface. In other cases, a cloud client 105 may display data received from the data center 120. In any of these cases, the data may be displayed in a type of graph to visually depict the data (e.g., a line graph, a multi-line chart, a bar chart, a combo-chart, a pie chart, or a combination thereof). The contact 110 or cloud client 105 may initially calculate default positions for objects associated with the data (e.g., labels) to be displayed in the user interface. However, size may be limited in the user interface of the contact 110 and cloud client 105, leading to the objects not being properly displayed. For example, there may be hundreds or thousands of objects to be displayed within the user interface, and the default positions of one or more of the objects may overlap, fall outside of the user interface boundaries, be cramped such that the displayed information is difficult to read or understand, etc. Additionally, a user of the contact 110 or cloud client 105 may resize one or more graphs in the user interface, which may further lead to the objects not being properly displayed. Furthermore, if the data updates dynamically, the shape of a graph in the user interface may change based on the dynamic underlying data, which may result in object overlap.

In order to identify overlapping objects, a system (e.g., a user device displaying the data, a backend server, an application, etc.) corresponding to the contact 110 or cloud client 105 may implement a "sweep" procedure using a sweep line. The sweep line may proceed across a first dimension (e.g., from left to right in the x-dimension) in the user interface, identifying the starting and ending coordinates for each data object at each increment in the sweep (i.e., when the sweep line encounters a starting coordinate in the first dimension for a first object, the system may also identify an ending coordinate for the first object in the first dimension). Additionally, when the starting coordinate for a first object is encountered, the system may store an interval in a second dimension (e.g., the y-dimension) corresponding to the first object that indicates the span of the first object in the second direction (e.g., the height of the object). If the system reaches the end coordinate for the first object in the first dimension without detecting any additional objects, the system may remove this interval from storage upon reaching the ending coordinate. Alternatively, if the sweep line encounters a start coordinate in the first dimension for a second object before reaching the ending coordinate for the first object, the system may determine the span of the second object in the second dimension.

In some cases, the system may then identify that the first object and the second object overlap in the second dimension based on the stored interval(s) (e.g., the system already knows that the two objects overlap in the x-dimension based on the sweep line encountering the second object before encountering the identified ending coordinate for the first object). Accordingly, the system may modify how the second object—or, in some cases, the first object—is displayed based on identifying the overlap. For example, in a first option, the system may hide or not draw the second object in the user interface. In a second option, the system may search for a next best location for the second object, which may correspond to a different start coordinate or a different end coordinate in the first dimension, a different interval in the second dimension, or some combination of these. If the next best location for the second object falls outside of the user interface, the system may further adjust the positioning of the second object such that it is located within the user interface and does not overlap the first object.

The system may identify and modify the object locations based on which objects are encountered first based on the sweep procedure (e.g., left to right). As such, in some cases, the next best location for the second object may overlap a next encountered object in the sweep procedure. For example, the next best location for the second object and a position for a third object may at least partially occupy the same space in the user interface. As such, since the second object was identified and modified based on being encountered first according to the sweep procedure prior to identifying the third object, the second object may take precedence and be displayed. The system may then determine how to modify the third object as described above (e.g., hide the third object, select a next best location for the third object, etc.).

Additionally, as noted above, the user interface may be resized or one or more graphs in the user interface may be resized. For example, the resizing may be based on a user preference (e.g., a user of the contact 110 or cloud client 105 may prefer a larger or smaller size for the user interface, chart, the objects, etc.), on the user device displaying the user interface (e.g., different user devices may have different display sizes), on a font or font size used for the user interface (e.g., a user device implementing a larger font size for the labels may experience more label overlap), or on a combination thereof. Accordingly, the system may re-determine whether to display each object or may recalculate default positions for each object based on the resizing. The system may further perform a worst-case scenario calculation based on the resized user interface to determine if there is enough space for all the objects to be displayed in the user interface in the first and second dimensions assuming a minimum size (e.g., one character) for each object. If it is determined that there is not enough room, the system may refrain from drawing any of the objects in the user interface. If it is determined that there is enough room, the system may then initiate the sweep procedure and modify object locations from the default positions as described above.

Conventional systems may draw the objects in a user interface regardless of overlapping objects, resulting in a cluttered display and users being unable to correctly read the objects. In some cases, a user may adjust the objects manually to mitigate the overlaps between objects. However, the manual adjustments may be time-intensive when dealing with large numbers of objects to be displayed (e.g., tens, hundreds, or thousands of objects). Additionally, the manual adjustments may be utilized only for static data presentations. If the data is dynamic, the graphs and objects may change periodically or aperiodically, such that manual adjustments may be overridden each time the data changes. In some cases, a brute force approach may be employed to search through all objects to identify overlapping objects, where the complexity of the brute force approach may be given as an $O(N^2)$ problem, where N is the number of objects. However, when large numbers of objects are displayed, the brute force approach may become too complex or may be inefficient to perform (e.g., incurring a large processing overhead or significant latency).

In contrast, the system 100 may support automatically drawing objects in a user interface of a contact 110 or cloud client 105 such that the objects do not overlap and are legible to a user accessing the user interface. To draw the objects with no overlaps, the system 100 may perform a sweep procedure involving a specific set of ordered steps (e.g., storing object coordinates and intervals in memory, incrementing a sweep line, handling overlapping objects during the sweep progression, and any other steps or processes described with respect to the sweep procedure). This sweep procedure may reduce the processing resources and time needed to identify and handle overlapping objects in a user interface. If two objects are identified to overlap in both a first and a second dimension during the sweep procedure, the system 100 may modify one of the objects to prevent the overlap. For example, the system 100 may hide the object (e.g., the system 100 may not render the object in the user interface) or may find a next best location to draw the object such that the objects no longer overlap. In some cases, the system 100 may refrain from drawing any objects in the user interface based on the data to be displayed being dense and having too many objects to display in the limited space of the user interface.

In these ways, the system 100 may improve user interfaces for user devices by displaying non-overlapping objects. These improvements may be especially useful for user devices with small screens (e.g., devices with limited display resources) or for charts displaying a large number of data points. In either of these cases, the specific sweep procedure described may efficiently and automatically modify the display of objects such that the objects are visible to a user and are located in logical positions within the user interface. For example, these logical positions may correspond to aesthetically pleasing locations within the user interface (e.g., positions where the objects are easy to read and visually pleasing, such as at a 45° angle from a point, above a curve if the area under the curve is shaded, etc.). In this way, a user may not be required to manually move objects (e.g., data labels) or select certain portions of the user interface in order to view the objects. Additionally, by using a single sweep, the system 100 may re-calculate how to display the objects in pseudo-real time (e.g., if the display size for a graph changes, if the underlying data is updated, etc.) with low latency and without requiring input from the user. This allows the system 100 to handle displaying dynamic sets of data without overlaps.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
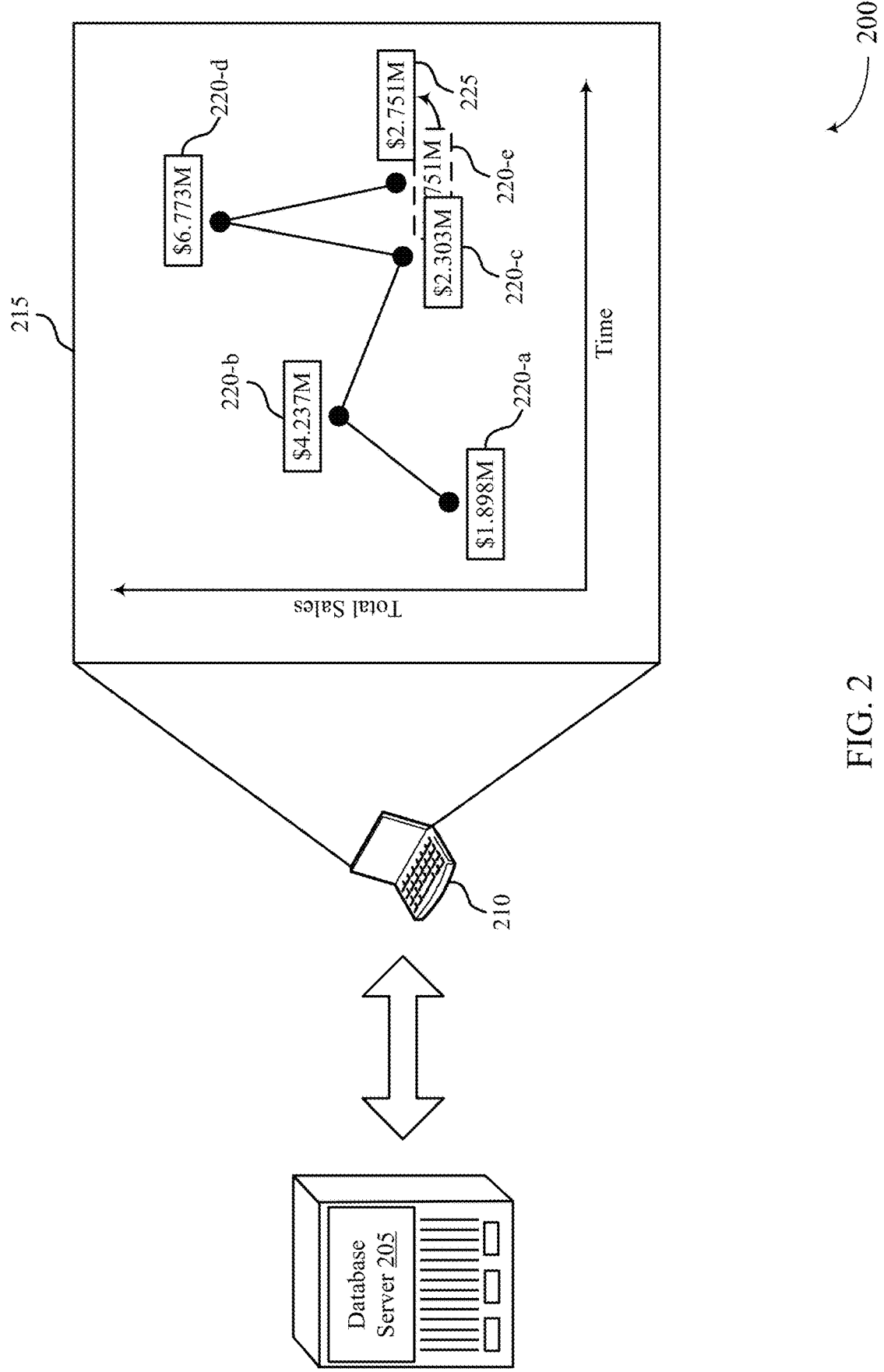
FIG. 2 illustrates an example of a system that supports modifying default display configurations for objects in a user interface in accordance with aspects of the present disclosure.

FIG. 2 illustrates an example of a system 200 that supports modifying default display configurations for objects in a user interface in accordance with aspects of the present disclosure. A database server 205 may transmit data to a user device 210, where the data is displayed on a user interface 215 of user device 210. In other cases, the user device 210 may display data received from other sources (e.g., user input, received from an application, etc.). In some cases, user interface 215 may have limited space to display the data. For example, multiple graphs may be displayed, reducing an allotted space for each graph, or a graph may occupy a large space of user interface 215. Accordingly, as described herein, one or more objects for the received data (e.g., labels) may not be displayed properly based on the limited space (e.g., overlap, fall outside user interface 215, etc.). A system may be employed in user device 210 or at a backend server to determine a configuration for displaying the objects in user interface 215 that is visually pleasing and allows a user of user device 210 to read the objects without overlaps between objects in the user interface 215.

When user device 210 determines to display the data (e.g., based on a user command, execution of an application, etc.), a system in user device 210 may calculate and determine default locations 220 for each object to display in user interface 215. For example, default location 220-a may be determined for a first data label corresponding to a first data point, default location 220-b may be determined for a second data label, default location 220-c may be determined for a third data label, default location 220-d may be determined for a fourth data label, and default location 220-e may be determined for a fifth data label. These default positions may be based on the underlying data and one or more algorithms or heuristics for calculating data label positioning. For example, for a line chart (as illustrated), the default location 220 for a label may be based on the incoming and outgoing slope of the line at the data point for that label. Alternatively, for a bar chart, the default location 220 for a label may be inside the bar or outside the bar (e.g., based on a size of the bar, a size of the label, or both).

In some cases, the system may perform a check on the default locations 220 to reposition any labels with default locations 220 outside the chart area back inside the chart area. For example, the system may implement an around-and-push algorithm to move labels inside the chart area or inside the user interface 215. To reposition the labels, the system may check, for each label, each edge of the chart (e.g., the top, left, bottom, and right edges) to determine if the default location 220 of the label overlaps one or more of the edges (e.g., if a portion of the label falls outside the chart area). If the system determines that a label falls outside the chart area, the system may move the label to a next position according to a predefined sequence (e.g., either a clockwise or counter-clockwise sequence). In one example sequence, the system may check the top edge of the chart area. If the default location 220 for a label falls outside the top edge, the system may reposition the label to the left of the data point. Similarly, a label that falls outside the left edge of the graph may be repositioned to the bottom of the data point, a label that falls outside the bottom edge of the graph may be repositioned to the right of the data point, and a label that falls outside the right edge of the graph may be repositioned to the top of the data point. In some examples, after each of these label moves, the system may optionally push the label position inside the chart area (i.e., away from the overlapping edge). The system may repeat this check to ensure that the new label position does not overlap any edge of the chart area or user interface 215.

In one specific example, the system may determine that the default location 220 for a label is partially outside the bottom edge of the graph (e.g., as defined by the axes of the graph) or partially outside the bottom edge of the user interface 215. The system may accordingly move the label position to the right (e.g., to a predefined location generally to the right of the associated data point). The system may then check if the label still overlaps with the bottom edge of the graph or user interface 215. If so, the system may push the label upwards in the graph such that the label no longer overlaps with the bottom edge. The system may then check if this new label position overlaps the right edge of the graph or user interface 215. If so, the system moves the label to a top position, and further pushes the label to the left if the label at this top position is still partially outside the right edge of the graph or user interface 215. The system may continue this process for the top edge and left edge of the graph. In many cases, a single move and/or push is used to reposition a label from a default location 220 outside the graph to a new location inside the graph. In some cases, alternative to performing this step prior to a sweeping procedure, the system may check for labels overlapping the chart or user interface 215 edges during the sweep procedure (e.g., in addition to checking for overlap with other labels).

To determine whether one or more objects overlap within user interface 215, the system in user device 205 may perform a sweep procedure to identify locations of each object. Initially, the system may put all coordinates in a first dimension (e.g., x-coordinates) for left and right edges of each object into a sorted array or priority queue. These edges may correspond to the default locations 220 for the labels, or to new locations based on moving the labels within the bounds of the chart or user interface 215. For an array, the system may sort the array by the x-coordinates of each edge. For a priority queue, the priority value assigned to each edge may be based on the x-coordinate for that edge (e.g., the left-most edges may have the highest priority). This priority queue may support modification throughout the sweep procedure. For example, if a label is moved to a "next best" location, the system may add the edges for this "next best" location to the priority queue on the fly for future processing in the sweep procedure.

The system may then increment along the first dimension (e.g., visualized by moving a sweep line, such as a vertical line, from left to right across the x-coordinates). The system may pop the edges from the priority queue or array to simulate the moving sweep line (e.g., popping the lowest x-coordinates first based on the priority values of the priority queue or based on the order of the sorted array). Each edge popped from the priority queue or sorted array may be an example of a starting edge or ending edge for any label in the graph (e.g., including any "next best" location labels added to the priority queue throughout the sweep procedure).

Alternatively, rather than incrementing the sweep based on the edges stored in the queue or array, the system may increment a sweep value by one across the full range of x-coordinates, and at each incremental coordinate the system may check for any corresponding edges (e.g., in an array or a static or dynamic lookup table). Similar to the priority queue, such a lookup table may be updated dynamically with the coordinates for "next best" locations if a label is repositioned during the sweep procedure.

When the system pops a starting edge (e.g., a left edge) for an object from the priority queue or sorted array, the system may check a corresponding top and bottom of the object as an interval in a second dimension (e.g., y-coordinates) to see if the object overlaps with other objects. For example, the system may store a y-interval search tree for the sweep procedure, and may compare the y-interval for the popped starting edge with the y-intervals stored in the search tree. In some cases, the system may additionally compare the y-interval for the popped starting edge with the edges of the graph or the user interface 215 (e.g., if the system did not initially perform an around-and-push algorithm). In these cases, the system may also compare the x-coordinates for the starting and ending edges with the left and right edges of the graph and user interface 215. This may ensure the labels do not fall outside the boundaries of the graph.

If there is no overlap between the y-interval for the popped starting edge and the y-intervals currently stored in the search tree, the system may draw the label corresponding to the popped starting edge and may add the y-interval for this label to the y-interval search tree. The position of this drawn label may not change during the remainder of the sweep procedure.

If the system identifies an overlap between the y-interval for the popped starting edge and the y-intervals currently stored in the search tree, the system may modify the display for one of these objects. For example, the system may modify the object corresponding to the popped edge. In one case, the system may hide or not draw (e.g., not render in the user interface 215) the object corresponding to the popped edge. If an object is hidden, the system may provide a mouse-over feature to pop up the hidden object when a user puts a cursor over the hidden object or over the corresponding data point. The objects (e.g., labels) and data points for the graph or data series may use a same color so that moved labels can be easily associated visually. In some cases, rather than completely hiding an object, the system may draw the object in a different (e.g., lighter) color. In a second case, the system may find a next best location for the object corresponding to the popped edge, and the system may move the object based on the next best location. The system may store the next best location(s) for an object. These next best locations may be pre-calculated for a data point (e.g., based on the incoming and outgoing slopes in a line chart) and stored in memory for that data point. To check a next best location for an object, the system may add the edges (e.g., the starting and ending edges in the x-dimension) for the object to the priority queue or sorted array. To support determining all object positions in a single sweep, the next best locations for an object have edges with x-coordinates larger than the previous x-coordinates for the object. In this way, the edges for the next best locations can be added in the correct positions within the priority queue. The system may continue the sweep procedure using this updated priority queue or sorted array (e.g., where the additional edges are placed with a priority or in an order corresponding to the x-coordinates of the edges). In some cases, the priority queue or sorted array may remove the ending edge from the priority queue or sorted array corresponding to the popped starting edge (e.g., the edge that resulted in an overlapping y-interval). In other cases, the priority queue or sorted array may not remove any edges at this point in the sweep procedure.

When the system pops an ending edge (e.g., a right edge) for an object from the priority queue or sorted array, the system may remove the y-interval corresponding to the object with the popped ending edge from the y-interval search tree. In some cases, the corresponding y-interval may not be present in the y-interval search tree (e.g., if the ending edges are not removed for starting edges that are not drawn based on object overlap). In these cases, the system attempting to remove the corresponding y-interval from the y-interval search tree may identify that the y-interval is not present in the tree, and may continue the sweep process without removing any interval.

This sweep process may continue through the entire priority queue or sorted array until each object is either drawn or determined not to be drawn. The complete sweep procedure may involve popping all of the edges for the default locations 220, as well as popping all of the edges for next best locations added into the priority queue or sorted array throughout the sweep procedure.

A specific example of a sweep procedure is illustrated in FIG. 2 with respect to a line graph and data labels. The system may determine the default positions 220 for the five data labels, and optionally the system may move any labels with default positions 220 falling partially outside of the graph or user interface 215. The system may then load the x-domain edges for the five labels into a priority queue, such that the priority queue contains:

[S1.0, S2.0, E1.0, E2.0, S3.0, S4.0, S5.0, E3.0, E4.0, E5.0], where S1.0 represents the starting edge for the first label and E1.0 represents the ending edge for the first label (e.g., corresponding to default position 220-*a*). The edges may be ordered by priority in the priority queue according to the x-dimension of each edge, where the smaller the x-value, the higher the priority, and the closer the edge is positioned to the front of the queue.

The sweep procedure may first pop the S1.0 edge from the priority queue and may determine the y-interval corresponding to the first object (e.g., the y-interval for default position 220-*a*). The system may check a y-interval search tree to determine if any interval in the y-interval search tree overlaps the y-interval for the first object. As the y-interval search tree is currently empty, the system may draw the first object at default position 220-*a* and may add the corresponding y-interval to the y-interval search tree.

Next, the system may pop the S2.0 edge and may check for y-interval overlap in the y-interval search tree. As the y-interval corresponding to the second object (e.g., the y-interval corresponding to default position 220-*b*) does not overlap with the y-interval stored in the search tree (e.g., the y-interval corresponding to default position 220-*a*), the system may draw the second object at default position 220-*b* and may add the corresponding y-interval to the search tree. The system may then pop the next edge from the priority queue. As the E1.0 edge is an ending edge, the system may remove the corresponding y-interval from the y-interval search tree. At this moment in the sweep procedure, the priority queue contains:

[E2.0, S3.0, S4.0, S5.0, E3.0, E4.0, E5.0], the y-interval search tree contains the y-interval for the second object (e.g., corresponding to default position 220-*b*), and the first and second objects are drawn in the line graph at default positions 220-*a* and 220-*b*, respectively.

The sweep procedure may continue similarly until popping the S5.0 edge corresponding to the starting edge of default position 220-*e* for the fifth object. At this moment in the sweep procedure, the first four object are drawn on the graph in default positions 220-*a*, 220-*b*, 220-*c*, and 220-*d*, respectively, and the y-interval tree contains the y-intervals for the third and fourth objects (e.g., corresponding to default positions 220-*c* and 220-*d*). The system may check for overlapping for default position 220-*e* in the y-interval search tree, and may identify that default position 220-*e* overlaps with an interval currently stored in the search tree (e.g., the y-interval for default position 220-*c*). As such, in a first example, the system may not draw the fifth object in the user interface 215, and may complete the sweep procedure, popping edges E3.0, E4.0, and E5.0. In a second example, the system may identify a next best location 225 for the fifth object and may add the edges for the next best location 225 into the priority queue. In this example, the priority queue may contain:

[E3.0, S5.1, E4.0, E5.0, E5.1], where S5.1 represents the starting edge for the fifth object at its first next best location 225 and E5.1 represents the ending edge for the fifth object at this first next best location 225. In some cases, the system may remove edge E5.0 from the priority queue based on determining the overlap for default position 220-*e*. In other cases, the system may not remove edge E5.0 from the priority queue until popping edge E5.0 from the queue during the sweep procedure.

The sweep procedure may next pop the E3.0 edge from the priority queue and may remove the corresponding y-interval from the y-interval search tree. If implementing the next best locations, the system may then pop the S5.1 edge from the priority queue, and may check for overlap. The system may determine that the y-interval for the next best location 225 does not overlap with any y-intervals currently stored in the y-interval search tree (i.e., the y-interval for the fourth object corresponding to default position 220-*d*). Accordingly, the system may draw the fifth object at the next best location 225 and add the y-interval for the fifth object (e.g., corresponding to the next best location 225) to the y-interval search tree. The system may then continue the sweep procedure, popping edge E4.0 and removing the corresponding y-interval from the search tree. In some cases, the system may then pop edge E5.0 from the priority queue and may attempt to remove the corresponding y-interval from the y-interval search tree. Because this y-interval was not added to the y-interval search tree (e.g., due to the overlap determined when popping edge S5.0), the system may not remove any interval from the search tree. Instead, the system may continue the sweep procedure, pop the E5.1 edge, and remove the y-interval corresponding to the next best location 225 from the y-interval search tree. At this point in the sweep procedure, the priority queue and the y-interval search tree are empty, so the system may determine that the sweep procedure is complete. Based on the sweep procedure, the line graph may include either four non-overlapping data labels drawn in default positions 220-*a*, 220-*b*, 220-*c*, and 220-*d*, respectively, or five non-overlapping data labels drawn in default positions 220-*a*, 220-*b*, 220-*c*, and 220-*d* and in next best location 225, respectively (e.g., based on whether the system does not draw overlapping objects or the system determines "next best" positions for overlapping objects).

The objects to be displayed in user interface 215 may be treated as individual shapes on a single layer (e.g., charts and graphs may have many layers containing different elements or shapes). In some cases, the system may calculate sizes of the objects to be displayed and check for overlaps before drawing the objects. Initially, the system in user device 210 may perform a worst-case calculation to see if enough room is available in both dimensions to draw the objects assuming all of the objects are a same, minimum size (e.g., one character). If the worst-case calculation indicates that there is not enough room (e.g., user interface 215 is too dense to draw the objects), none of the objects may be drawn. Alternatively, if it is determined there is enough room, the sweeping procedure may be performed to scan all of the two-dimensional objects in the first dimension (e.g., sweeping from left to right in the x-dimension) and projecting the range of each object to the second dimension (e.g., determining the interval for each object in the y-dimension). As such, the system may utilize a one-dimension range search in the second dimension to find any overlap between objects, and then hide or relocate any corresponding overlapping objects during the sweep procedure. The complexity of performing this one-dimension range search and scan may be given as N log N+R log N, where N is the number of objects and R is the number of object intersections (e.g., overlaps).

In some cases, data in the user interface 215 may be updated dynamically. For example, data points may be added to the user interface 215, data points may be removed from the user interface 215, data points may be changed in the user interface 215, etc. Based on the dynamic updates, the size of a display in the user interface 215 for the data may change and/or default locations 220 for one or more objects may change. Accordingly, the worst-case calculation and default locations 220 may be determined each time the data is dynamically updated. Additionally, a sweeping procedure may be performed to ensure no overlaps occur based on the updated data and revised locations for the displayed objects.

FIGS. 3A-3E illustrate an example of a sweep procedure 300 that supports modifying default display configurations for objects in a user interface in accordance with aspects of the present disclosure. A system may identify a set of objects 315 (e.g., labels, captions, values, icons, toggles, etc.) to draw (e.g., display in a user interface), where the objects 315 occupy a first dimension 305 and a second dimension 310 according to calculated default locations. A sweep line 320 may illustrate a current coordinate of the sweep procedure in the first dimension 305. The system may track a list of intervals 325 at each step of the sweep (e.g., each location of the sweep line 320) to determine if any of the objects 315 overlap in both dimensions. If a first and second object 315 are determined to overlap, the sweep procedure may modify the second object 315 to mitigate the overlap. Initially, starting and ending coordinates in the first dimension 305 for each object 315 may be stored in a local memory storage (e.g., a list in memory for the set of objects 315).

Figure 3A:
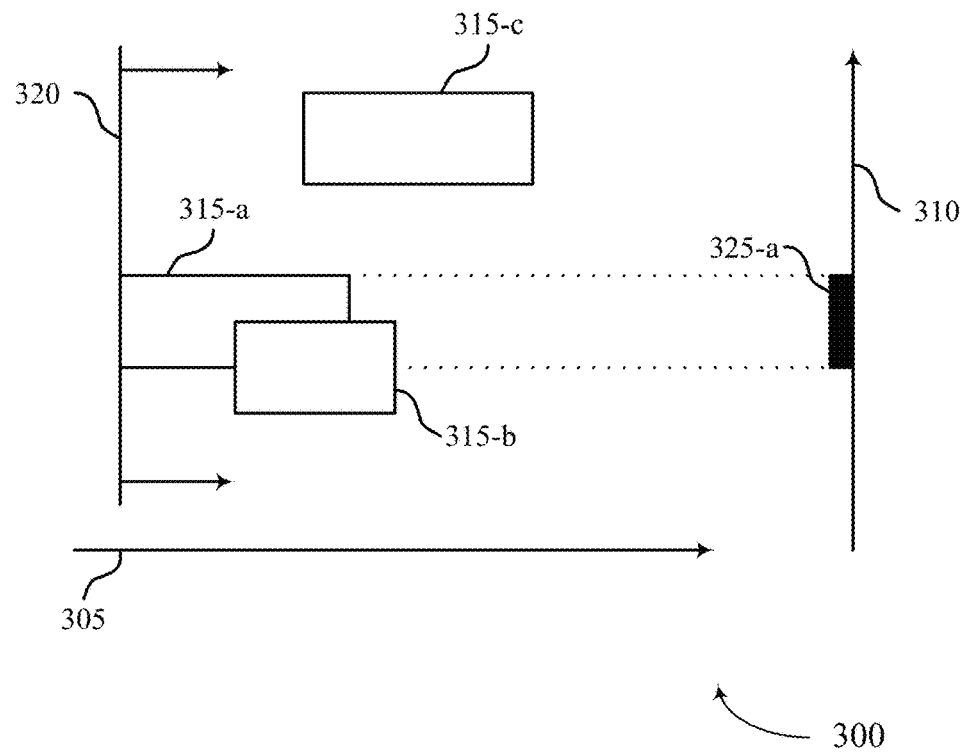
FIGS. 3A-3E illustrate an example of a sweeping procedure that supports modifying default display configurations for objects in a user interface in accordance with aspects of the present disclosure.

In FIG. 3A, the sweep procedure 300 may begin by encountering a left edge of a first object 315-a (e.g., where the sweep line 320 illustrates the current first dimension coordinate being evaluated by the system for the sweep procedure 300). In some cases, the sweep procedure 300 may begin at a fixed starting point (e.g., x=0) and may increment a reference value in the first dimension 305 by a pre-determined incremental amount until an object edge is encountered. In other cases, the sweep procedure 300 may pop the edges of the objects 315 from a priority queue or sorted array based on the stored starting and ending coordinates for each object 315 in local memory storage and may increment from one edge to the next. For example, as the left edge of the first object 315-a is the edge furthest to the left, in a sweep from left to right the sweep procedure 300 may start at the x-coordinate for this first edge (e.g., where the sweep line 320 illustrates the first step of the sweep procedure 300). The sweep procedure 300 may then identify a first interval 325-a in the second dimension 310 for the first object 315-a (e.g., based on a minimum value and a maximum value in the second dimension 310 for the object 315-a). The first interval 325-a may indicate a span of the first object 315-a in the second dimension 310 (e.g., the y-interval for the first object 315-a). The system (e.g., a user device that will display the set of objects 315) may store a current list of intervals 325 in memory (e.g., volatile or persistent memory), where the current list corresponds to objects 315 intersecting the sweep line 320.

Figure 3B:
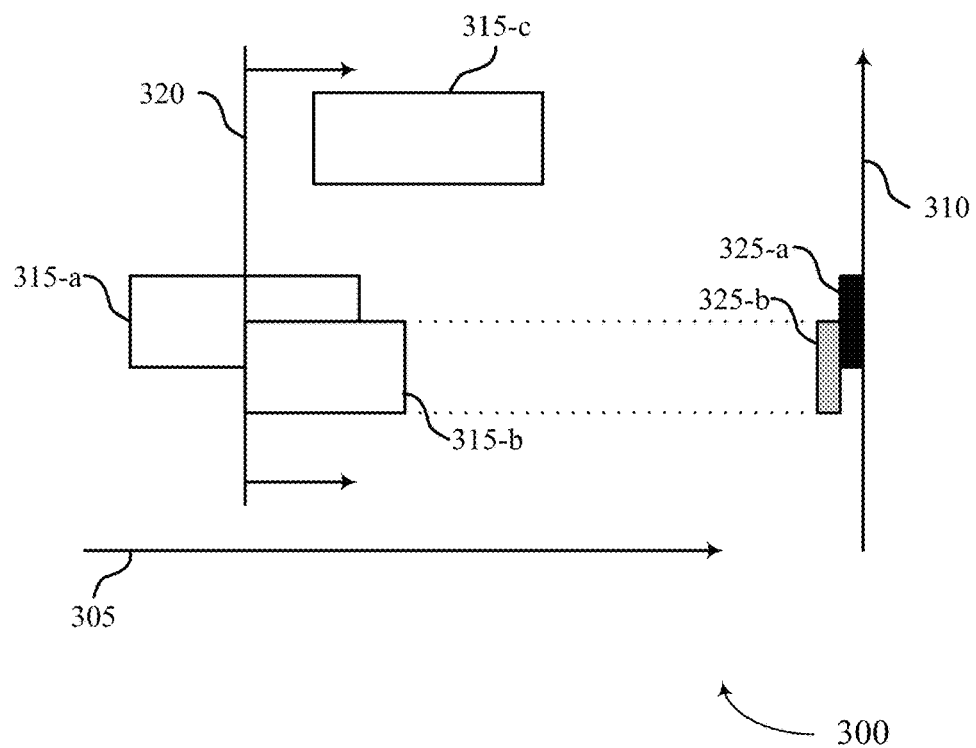

In FIG. 3B, the sweep procedure 300 may proceed along the first dimension 305 and encounter a left edge of a second object 315-b (e.g., illustrated by the sweep line 320). The sweeping procedure 300 may then identify a second interval 325-b corresponding to the range of the second object 315-b in the second dimension 310. As shown, the first interval 325-a and the second interval 325-b may partially overlap (e.g., at least a portion of the first interval 325-a includes the same y-coordinate(s) as a portion of the second interval 325-b). Based on the intervals 325 overlapping and the implicit overlap in the first dimension 305 based on the sweep, the sweeping procedure 300 may determine that the first object 315-a and the second object 315-b overlap. Accordingly, since the first object 315-a is already drawn, the system may modify the display of the second object 315-b and leave the first object 315-a in its default location to mitigate the overlap. Based on identifying the overlap, the system may not store the second interval 325-b in the current list of intervals in memory.

Figure 3C:
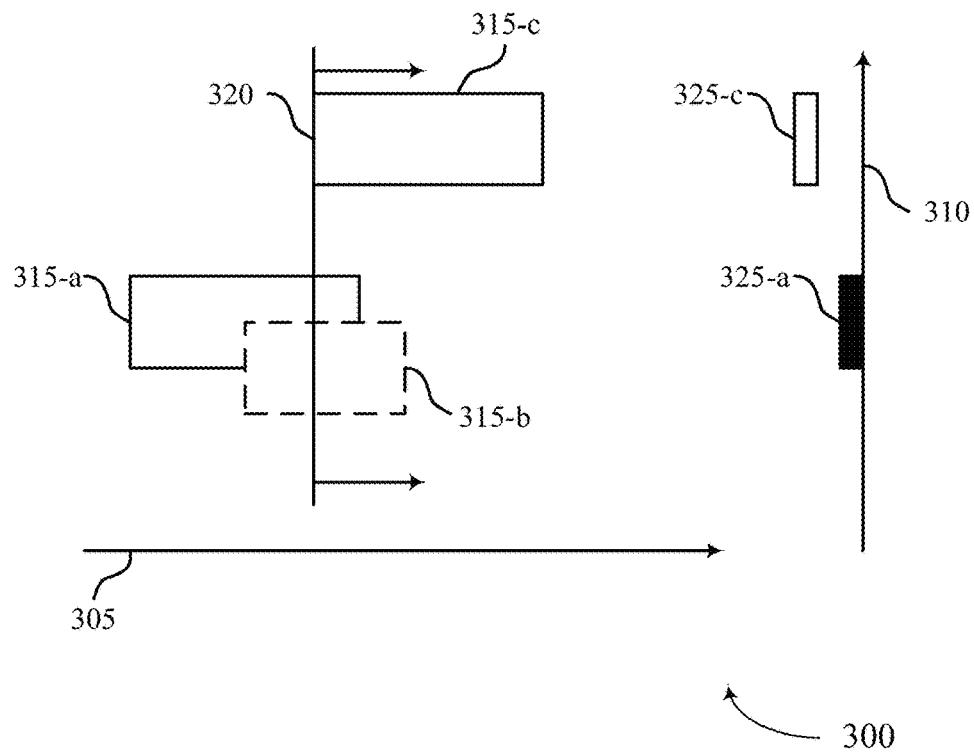

In FIG. 3C, according to a first overlap handling technique, the sweep procedure 300 may modify the second object 315-b by hiding or not drawing the second object 315-b. As noted above with reference to FIG. 1, if an object 315 is hidden, a mouseover tool may be utilized to display data for the hidden object 315. In some cases, the system may not draw or display the second object 315-b, saving processing resources that may be used to draw and hide the second object 315-b. After the second object 315-b is hidden, the sweep procedure 300 may progress along the first dimension 305 and encounter a third object 315-c, where a third interval 325-c is identified for the span of the third object 315-c in the second dimension 310. However, the first interval 325-a and the third interval 325-c may not overlap, so the third object 315-c may not be modified and may be displayed at the initially calculated default position. The third interval 325-c may be added to the current list of intervals in memory, so the list includes both the first interval 325-a and the third interval 325-c but not the second interval 325-b at this moment in the sweep (e.g., when the sweep is analyzing the x-coordinate illustrated by the sweep line 320). Additionally, although not shown, once sweep line 320 reaches the right edge of an object 315, the corresponding interval 325 may be removed from the current list of intervals in memory. For example, once the right edge of the first object 315-a is encountered, the first interval 325-a for the second dimension 310 may be removed from the current list of intervals. Once the sweep procedure 300 has concluded, no overlapping objects will be displayed in the user interface, as any object 315 that overlaps another object 315 and has a leading edge further to the right in the user interface than the other object 315 will be hidden or not drawn according to this overlap handling technique.

Figure 3D:
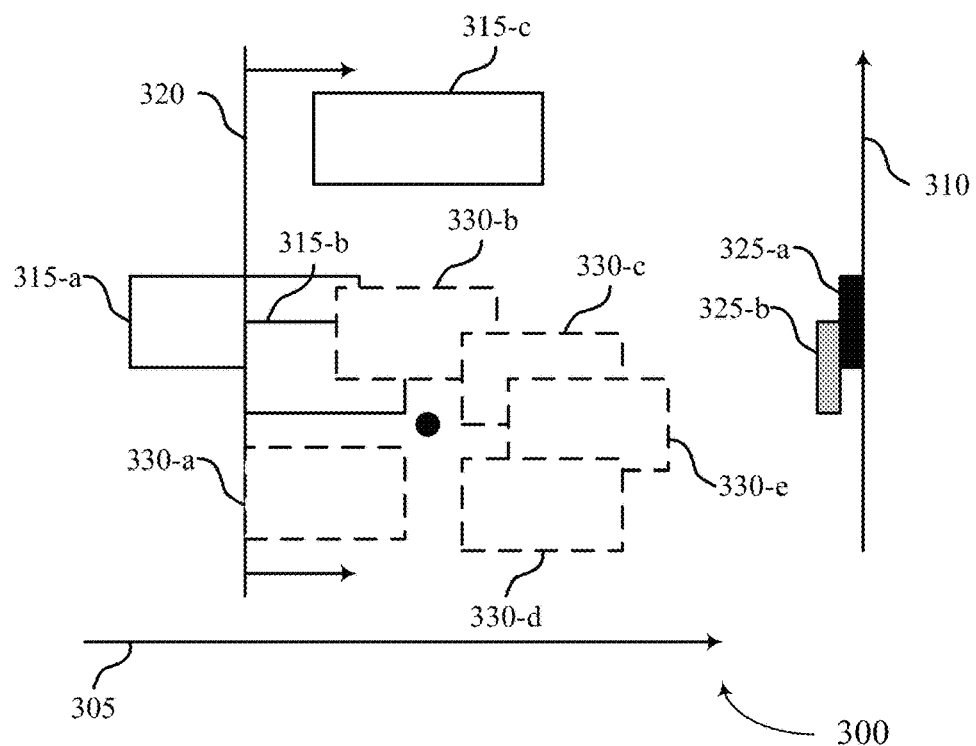

In FIG. 3D, in a second overlap handling technique, a next best location may be determined for the overlapping second object 315-b to mitigate the overlap between the first object 315-a and the second object 315-b. A set of possible locations 330 may be evaluated for the next best location for moving the second object 315-b, where the possible locations 330 are evaluated based on a priority. The set of possible locations 330 may be evaluated in the same direction as the sweep procedure 300 in order to determine all object positions in a single sweep. For example, the set of possible locations 330 may be evaluated from left to right and, in one case, from high to low. Accordingly, possible location 330-a may be evaluated first, possible location 330-b may be evaluated second, possible location 330-c may be evaluated third, possible location 330-d may be evaluated fourth, and possible location 330-e may be evaluated fifth. When evaluating the possible locations 330, any previously identified intervals 325 for objects 315 partially occupying the same first dimension 305 as the object 315 being modified may be compared to an interval for the possible locations 330. If the interval for the possible location 330 does not overlap a previously identified interval 325 (e.g., an interval 325 in the current list of intervals stored in memory at the moment in the sweep illustrated by the sweep line 320), the possible location 330 may be chosen for the next best location. These possible locations 330 may be evaluated using the normal sweep procedure. For example, the first possible location 330 (e.g., possible location 330-a) may be evaluated first, and the edges for this possible location 330-a may be added to the priority queue or sorted array. If this possible location 330-a is also determined to overlap a drawn object, the system may then add the edges for the next possible location 330 (e.g., possible location 330-b) to the priority queue or sorted array.

Figure 3E:
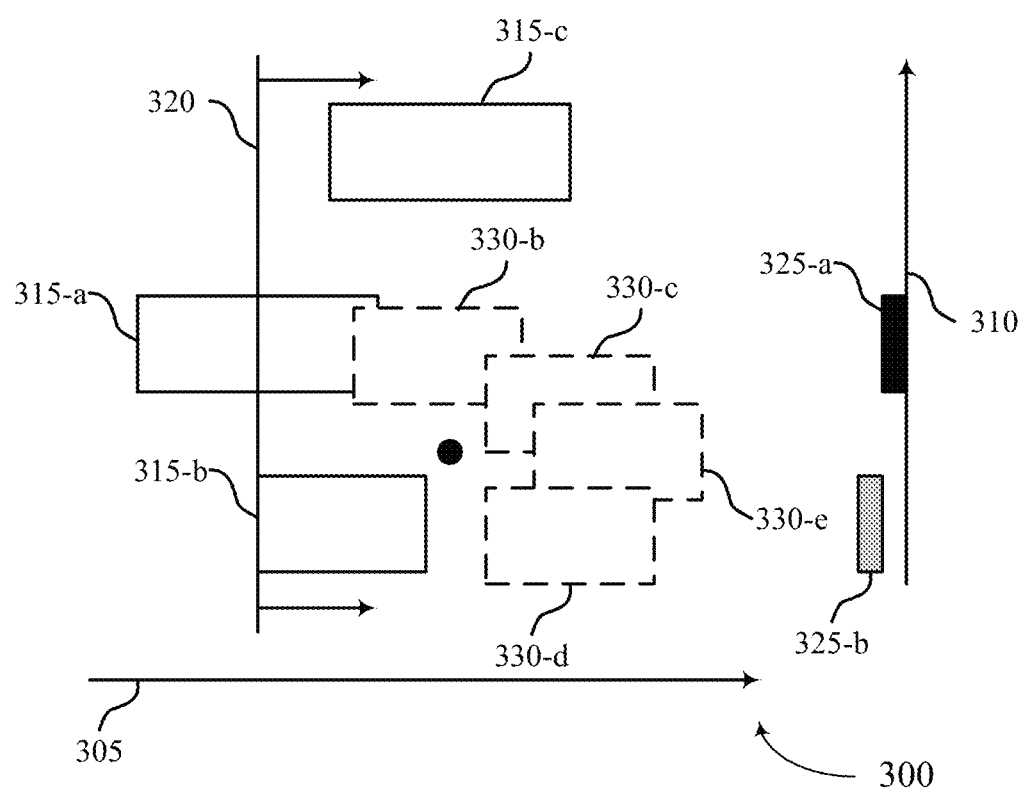

In FIG. 3E, the second object 315-b may be relocated from the initial default location to one of the evaluated possible locations 330 as described in FIG. 3D. The first evaluated possible location 330-a as described with reference to FIG. 3D may correspond to a second interval 325-b in the second dimension 310. Since the second interval 325-b does not overlap with any intervals in the stored current list of intervals (e.g., the first interval 325-a in the second dimension 310), the possible location 330-a may be chosen as the next best location, and the second object 315-b may be repositioned accordingly. The system may draw the second object 315-b at the selected possible location 330-a. The system may add the interval 325-b corresponding to the repositioned second object 315-b to the current list of intervals, and may not evaluate the possible locations 330-b, 330-c, 330-d, or 330-e later in the sweep (e.g., due to displaying the second object 315-b at possible location 330-a). If each of the possible locations 330 overlaps a drawn object 315, the system may determine to hide or not draw the second object 315-b. In this way, once the sweep procedure 300 has concluded, no objects will overlap in the user interface, as any object 315 that overlaps another object 315 and has a leading edge further to the right in the user interface than the other object 315 will be repositioned to a non-overlapping location according to this overlap handling technique, or may be hidden or not drawn if no valid next best location exists.

FIGS. 4A-4D illustrate examples of object positions 400-a, 400-b, 400-c, and 400-d, respectively, that support modifying default display configurations for objects in a user interface in accordance with aspects of the present disclosure. When a default location for an object is determined or an object is modified and moved to a next best location, the default locations (e.g., predetermined best locations) and next best locations may depend on a slope of an incoming line to a point associated with the object, a slope of an outgoing line from the point, an angle between these two lines, or some combination of these. Additionally, the next best locations may be based on the direction of a sweep procedure. For example, when performing a sweep from left to right, the leading edges for the next best locations may be located at the same x-coordinate or to the right of the x-coordinate for the leading edge of the default location, with the next best locations decreasing in priority from left to right.

It should be noted that the object positions described below relate to line charts or graphs. However, the process for modifying default display configurations for objects in a user interface described herein applies to many other types of displays, including labels for other types of charts (e.g., bar charts, pie charts, line charts with fitted curves, etc.). For example, labels for bar charts may be placed at default positions inside or outside of each bar of the bar chart and may be removed or repositioned using a similar procedure to the one described herein. Additionally or alternatively, the process for modifying default display configurations for objects may apply to any other items displayed in a user interface that may be represented on a same layer. These items may include, but are not limited to, images, videos, text, characters, or any other items displayed on the screen of a user device.

In FIG. 4A, object positions 400-a may illustrate a positive slope for an incoming line to a point (e.g., a data point in a line chart) and a negative slope for an outgoing line from the point. An object 405-a may be placed at the tip of the point based on an angle between the incoming line and the outgoing line. For example, the angle between the two lines is an acute angle (i.e., less than 90 degrees), resulting in a sharp V and a visually appealing position for the object 405-a at the tip of the V. The object 405-a may be placed initially at the tip of the point as a default location. However, as described herein, the object 405-a may overlap with a previously occurring object. As such, the object 405-a may be relocated to a next best location 410, where one or more next best locations 410 are evaluated to determine if the next best location 410 still overlaps with previous occurring objects. The sequence of evaluating the next best locations 410 may be based on priority of location. For example, the next best locations may be evaluated from left to right (e.g., when a sweep procedure is performed from left to right). For objects with leading edges at the same x-coordinate, the objects may be evaluated in any pre-determined order (e.g., from top to bottom). As shown, next best location 410-a may be evaluated first, next best location 410-b may be evaluated second, and next best location 410-c may be evaluated third.

In some cases, the evaluation may include "placing" the object 405-a (e.g., based on it overlapping with a previous occurring object during a sweeping procedure) at the next best location 410 according to the sequence as described herein. "Placing" the object 405-a may involve adding the coordinates for the new position of the object to a priority queue or sorted array (e.g., adding the starting edge and ending edge x-coordinates for next best location 410-a to the priority queue or sorted array, where the corresponding y-interval for next best location 410-a is stored in memory and associated with these edges). In some cases, the system may remove the ending edge x-coordinate for the default position determined to overlap with another object from the priority queue or sorted array, and the system may remove the corresponding y-interval for the default position for object 405-a from an active list in memory. This priority queue or sorted array stored in memory may be used during the sweep procedure for popping edges and evaluating the corresponding intervals. As the sweeping procedure continues, the sweep may encounter the object 405-a again at the next best location 410 (e.g., next best location 410-a) and check for any overlap with other objects. If the object 405-a still overlaps another object, a further next best location 410 (e.g., next best location 410-b) may be assigned and evaluated for the object 405-a. The sweeping procedure and evaluations of the next best locations 410 may be continued until no more next best locations 410 are available for the object 405-a. Accordingly, the object 405-a may be hidden or not drawn if no more next possible locations are available.

In FIG. 4B, object positions 400-b may illustrate a negative slope for an incoming line to a point and a positive slope for an outgoing line from the point. Similar to object positions 400-a as described above with reference to FIG. 4A, an object 405-b may be initially placed at a tip of the point based on an angle between the incoming line and the outgoing line. If the initial placement (e.g., default location) of the object 405-b overlaps with a previous occurring object (e.g., an object already drawn or set for display in a sweep procedure), next best locations 415 may be evaluated for relocating the object 405-b, where the next best locations 415 are evaluated based on a predetermined sequence. For example, next best location 415-a may be evaluated first, next best location 415-b may be evaluated second, and next best location 415-c may be evaluated third. In some cases, similar to the evaluation order described above with reference to FIG. 4A, next best location 415-b may be evaluated first, next best location 415-a may be evaluated second, and next best location 415-c may be evaluated third.

In FIG. 4C, object positions 400-c may illustrate a negative slope for both an incoming line and for an outgoing line associated with a point. An object 405-c may be initially placed at an upper 45-degree location outside of the point based on an angle between the incoming line and the outgoing line and the slope of both lines. For example, the angle between the incoming and outgoing lines may be obtuse (i.e., greater than 90 degrees) and both lines may have a negative slope. Accordingly, the object 405-c may be placed at an upper 45-degree location to the right of the point. In some cases, the area to the left of the lines and the point may be shaded with a color and placing the object 405-c within the shaded area may not be desired. Additionally, a next best location 420 may be evaluated if the initial placement of the object 405-c overlaps with a previous occurring object.

In FIG. 4D, object positions 400-d may illustrate a positive slope for both an incoming line and for an outgoing line associated with a point. As described above with reference to FIG. 4C, an object 405-d may be initially placed at an upper 45-degree location outside of the point based on an angle between the incoming line and the outgoing line and the slope of both lines. For example, the angle between the incoming and outgoing lines may be obtuse and both lines may have a positive slope. Accordingly, the object 405-d may be placed at an upper 45-degree location to the left of the point (e.g., in some cases based on the area to the right of the lines and point potentially being shaded). As described herein, next best locations 425 may be evaluated when the object 405-d overlaps a previously occurring object. Next best location 425-a may be evaluated first, next best location 425-b may be evaluated second, next best location 425-c may be evaluated third, next best location 425-d may be evaluated fourth, next best location 425-e may be evaluated fifth, and next best location 425-f may be evaluated sixth. Even though one or more next possible locations 425 are located to the right of the point and both lines, it may be preferred to draw the object 405-d in that region as opposed to hiding the object 405-d.

Object positions 400-a, 400-b, 400-c, and 400-d may be utilized for a sweeping procedure where a sweep line progresses from left to right in a first dimension. Alternatively, a visual display for points, lines, and objects 405 may be rotated 90 degrees, and the predetermined default locations and next best locations may be different for the rotated display. Additionally, the sweep procedure may progress vertically from bottom to top, or may progress in any other direction. The default locations and next best locations described above are given as examples. In some cases, the locations may be based on a standard sequence (e.g., left upper 45-degree location, then top or bottom locations, then right upper 45-degree location, then right location). In other cases, a user may specify preferred default and/or next best locations for objects based on certain criteria (e.g., slopes, angles, etc.). In other cases, a user may select a number of next best locations for the system to test during a sweep procedure. In yet other cases, the system may evaluate manual repositioning performed by a user, and may determine default and/or next best positions for objects based on the manual repositioning (e.g., using a machine learning process). In this way, the system may determine personalized or unique positionings for objects for a certain user, for a certain application or type of chart, etc.

FIGS. 5A-5D illustrate an example of a sweep procedure 500 that supports modifying default display configurations for objects in a user interface in accordance with aspects of the present disclosure. Sweep procedure 500 may be utilized to identify if one or more objects 515 (e.g., labels) overlap in both a first dimension 505 and a second dimension 510. A system may perform the sweep procedure 500, where the system may be internal to a user device displaying the objects 515 or may be a component of an application server, a database server, a backend server, a server cluster, or a virtual machine. A sweep line 520 may progress from left to right as part of the sweep procedure 500 (or may be used herein to visualize and describe the progression of the sweep procedure 500).

Figure 5A:
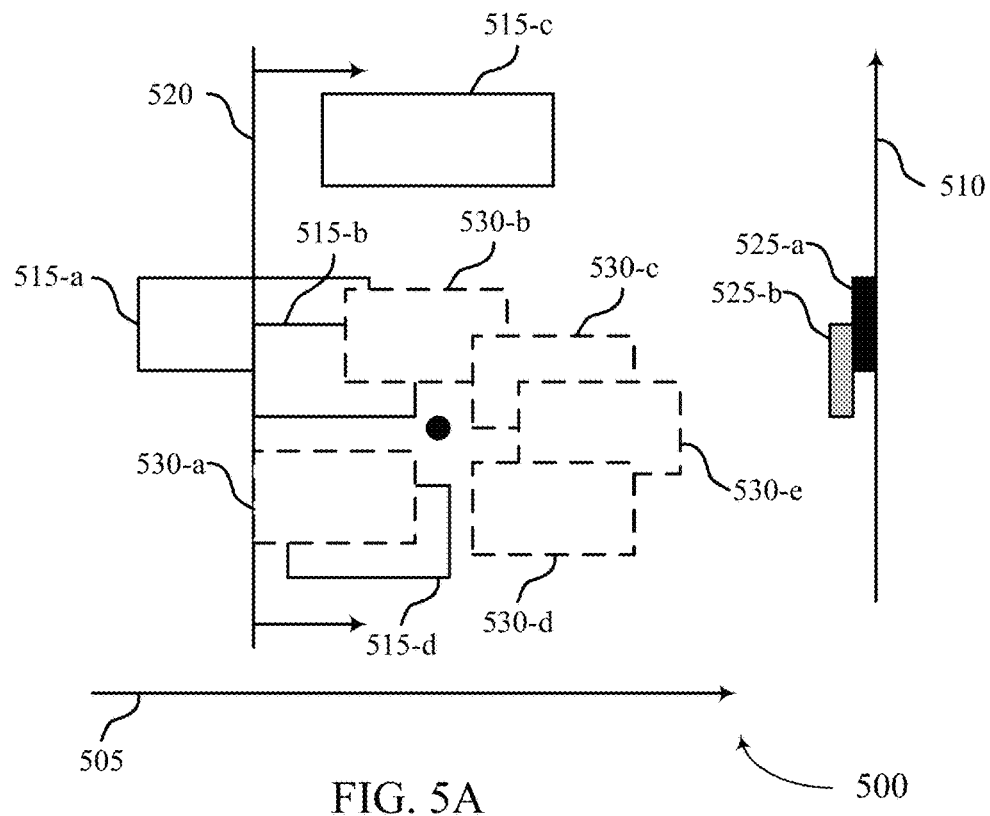
FIGS. 5A-5D illustrate an example of a sweeping procedure that supports modifying default display configurations for objects in a user interface in accordance with aspects of the present disclosure.

In FIG. 5A, the sweep line 520 may encounter (i.e., the sweep procedure 500 may progress to) a left edge of a first object 515-a and the system may store a first interval 525-a for the first object 515-a, where the first interval 525-a indicates a span in the second dimension 510 for the first object 515-a. The sweep line 520 may then encounter a second object 515-b before reaching the right edge of the first object 515-a. Accordingly, a second interval 525-b may be determined for the second object 515-b, where the first interval 525-a and the second interval 525-b overlap. Based on the overlap, the second object 515-b may be modified as described herein to mitigate the overlap. In some cases, a set of next possible locations 530 may be evaluated for relocating the second object 515-b. Based on the determined intervals 525, the next best location 530-a may be determined to be available (e.g., prior to incrementing the sweep line 520 further), and the second object 515-b may be relocated to the next best location 530-a. For example, the first interval 525-a and a determined interval 525 corresponding to the next best location 530-a may not overlap, and, as such, the next best location 530-a may be determined to be available for the second object 515-b even though it overlaps with a fourth object 515-d. The sweep line 520 may not look ahead at the locations of objects, so it may not detect the fourth object 515-*d* until it progresses past the second object 515-*b* and reaches the leading edge for the fourth object 515-*d* (e.g., pops the leading edge for the fourth object 515-*d* from a priority queue). That is, because the sweep procedure 500 efficiently operates in a single dimension (e.g., the y-dimension, as illustrated by the sweep line 520) at each moment during the sweep, the sweep procedure 500 may not track or identify positions of objects 515 to the left or the right of the sweep line 520.

Figure 5B:
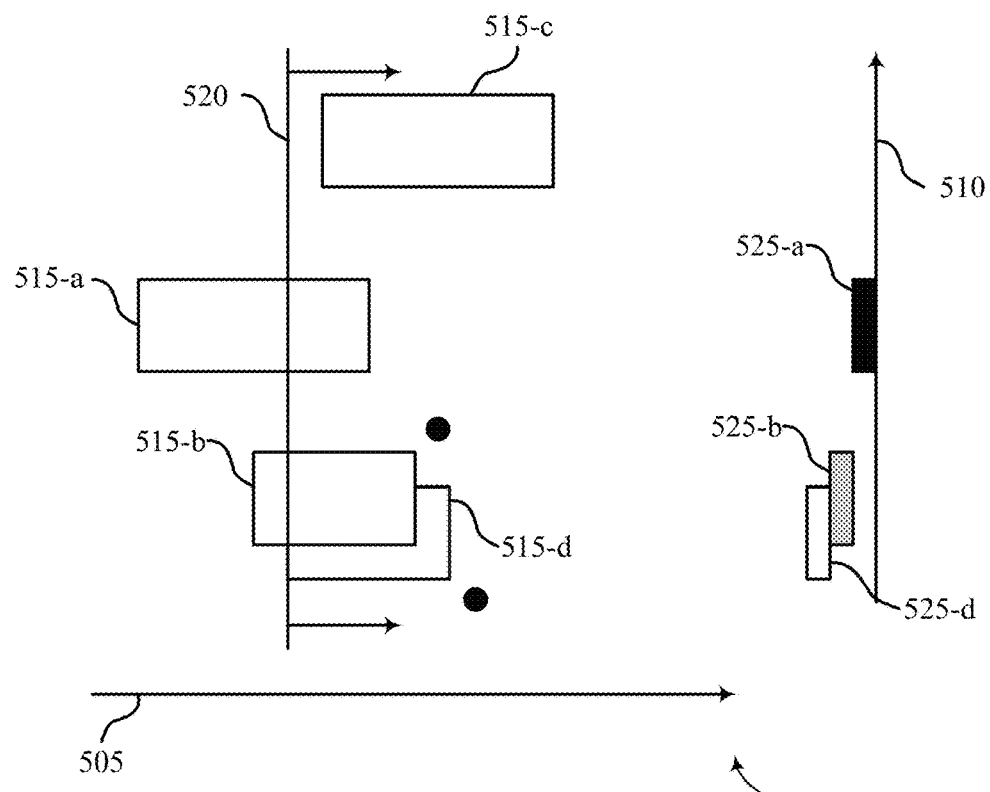

In FIG. 5B, the sweep line 520 may encounter the fourth object 515-*d* and determine a fourth interval 525-*d*. The fourth interval 525-*d* may overlap with the second interval 525-*b* that was determined in FIG. 5A. As such, the fourth object 515-*d* may be modified to mitigate the overlap with the relocated second object 515-*b*.

Figure 5C:
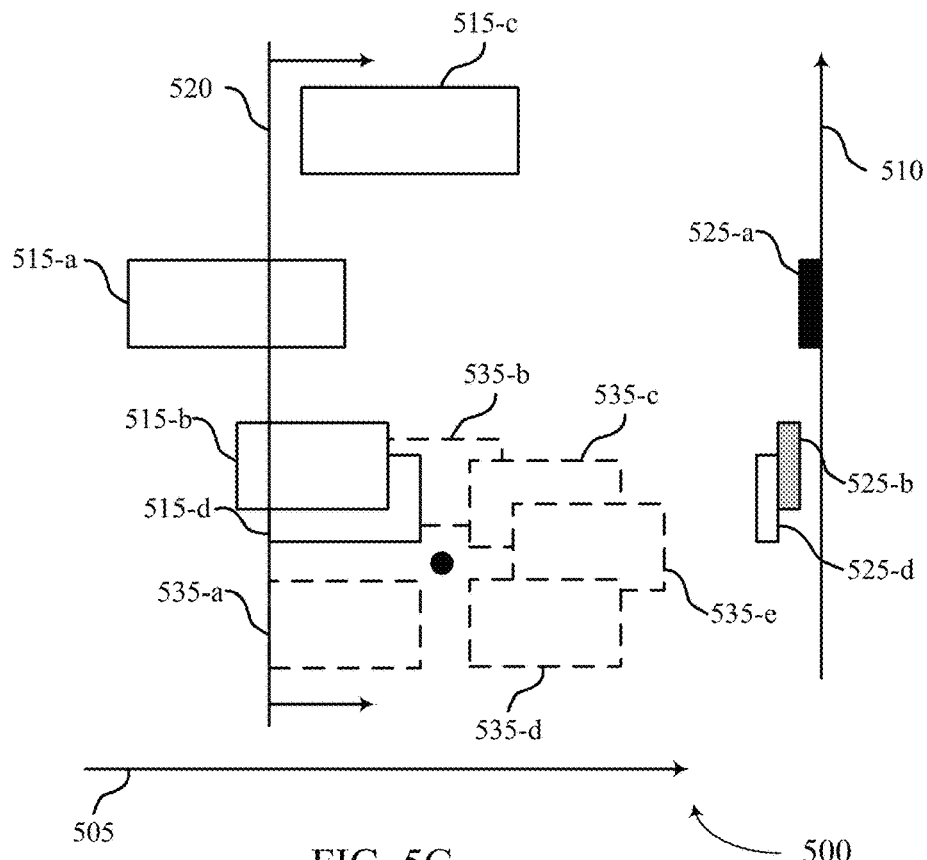

In FIG. 5C, a set of next available positions 535 may be evaluated for relocating the fourth object 515-*d*. As described above with reference to FIGS. 4A-4D, the next available positions 535 may be evaluated based on a priority associated with their position relative to a default location for the fourth object 515-*d*. For example, the next best location 535-*a* may be evaluated first, the next best location 535-*b* may be evaluated second (e.g., if the next best location 535-*a* is not valid due to overlap), the next best location 535-*c* may be evaluated third, the next best location 535-*d* may be evaluated fourth, and the next best location 535-*e* may be evaluated fifth (e.g., from left to right and top to bottom). If the next best location 535-*e* is not valid due to overlap, the system may hide or not draw the fourth object 515-*d*.

Figure 5D:
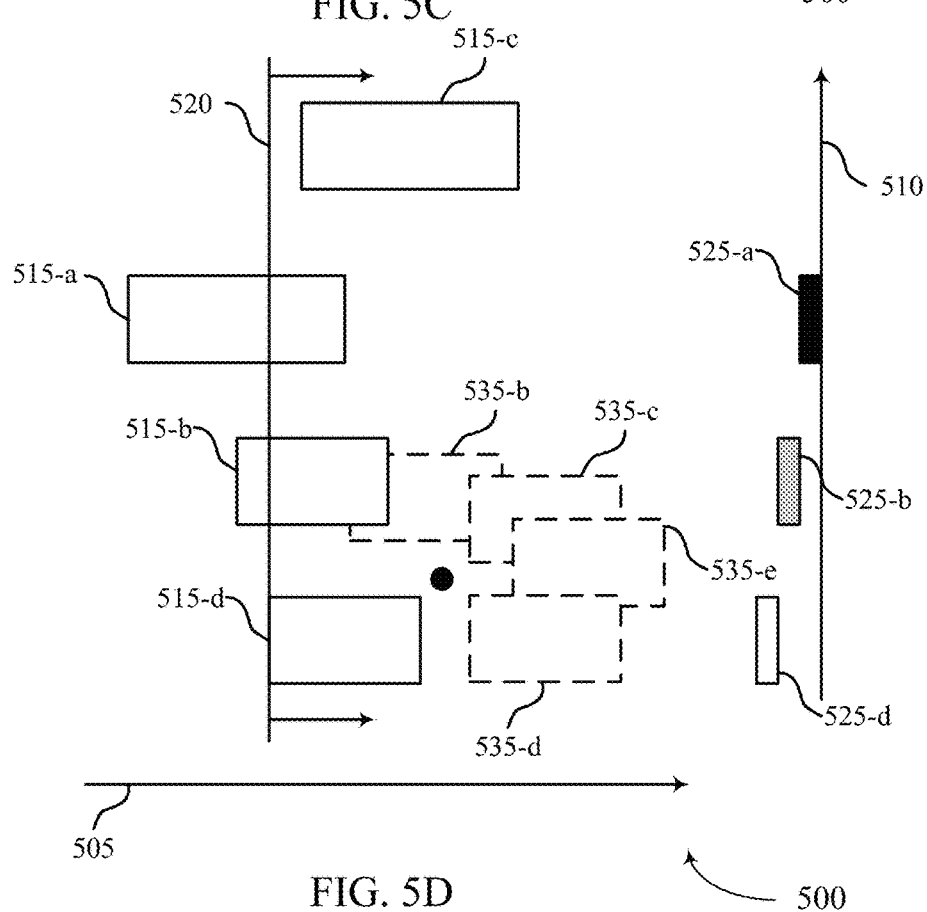

In FIG. 5D, the next best location 535-*a* may be evaluated for relocating the fourth object 515-*d*. Accordingly, the fourth interval 525-*d* may be determined based on the next best location 535-*a*. Since the fourth interval 525-*d* does not overlap with other previously determined intervals 525 (e.g., the first interval 525-*a* and the second interval 525-*b*), the fourth object 515-*d* may be relocated to the space of the next best location 535-*a*. Although not shown, if each of the next best locations 535 are evaluated and determined to overlap previously identified objects 515 and their corresponding intervals 525, the fourth object 515-*d* may be hidden or not drawn to mitigate the overlap.

FIGS. 6A-6E illustrate an example of an object movement procedure 600 that supports modifying default display configurations for objects in a user interface in accordance with aspects of the present disclosure. As described herein, a sweeping procedure may be utilized to determine if one or more objects 615 overlap in a first dimension 605 and a second dimension 610. If an overlap is detected, one of the objects 615 that is part of the overlap may be modified to mitigate the overlap. In addition to mitigating overlaps, the sweeping procedure may ensure that the objects 615 are within boundaries of a user interface (e.g., a window defined by an application, a graph, the screen of a user device, etc.). Alternatively, the system may ensure that the objects 615 are within the boundaries of the user interface prior to the sweeping procedure.

Figure 6A:
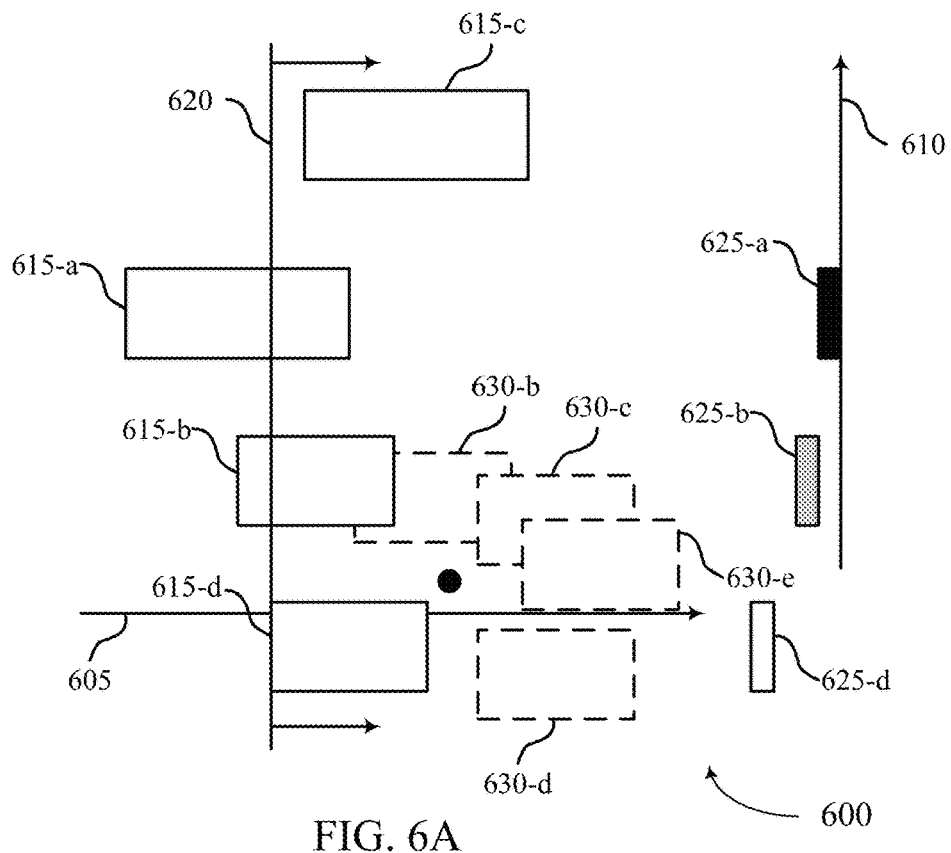
FIGS. 6A-6E illustrate an example of an object movement procedure that supports modifying default display configurations for objects in a user interface in accordance with aspects of the present disclosure.

In FIG. 6A, a fourth object 615-*d* may have been relocated to mitigate an overlap with a second object 615-*b* as described above with reference to FIGS. 5A-5D. However, the fourth object 615-*d* may fall outside a boundary of the user interface (e.g., outside a graph area) based on a chosen next best location 630. In other cases, the fourth object 615-*d* may be positioned fully or partially outside the boundary based on a default position for the fourth object 615-*d*. In a first example, the sweeping procedure may continue to evaluate the rest of the next best locations 630. The next best location 630-*b* may still overlap with the second object 615-*b*, so the next best location 630-*c* may be selected (e.g., when the sweep procedure progresses to the leading edge of the next best location 630-*c*) for relocating the fourth object 615-*d* to mitigate the overlap with the second object 615-*b* and to mitigate the fourth object 615-*d* overlapping with a boundary of the user interface.

Figure 6B:
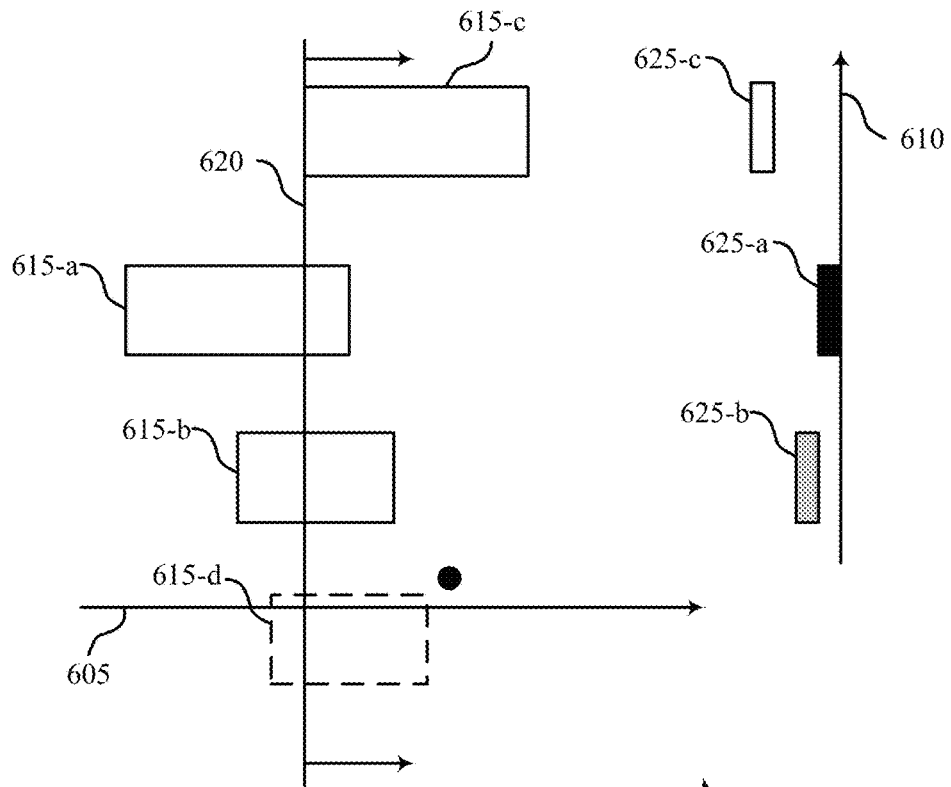

In FIG. 6B, in a second example, the fourth object 615-*d* may be hidden or not drawn based on the fourth object 615-*d* falling outside of one or more boundaries of the user interface, and the sweep line 620 may progress and encounter a third object 615-*c*. Accordingly, a third interval 625-*c* may be determined for the third object 615-*c* to determine if an overlap exists with the third object 615-*c* and the previously identified objects 615. Since no overlap exists, the third object 615-*c* may remain at a default location previously determined. As noted above, a mouseover tool may be utilized when hiding or not drawing an object 615 that displays the hidden or previously not drawn object 615 when a cursor is on top of the associated data point.

Figure 6C:
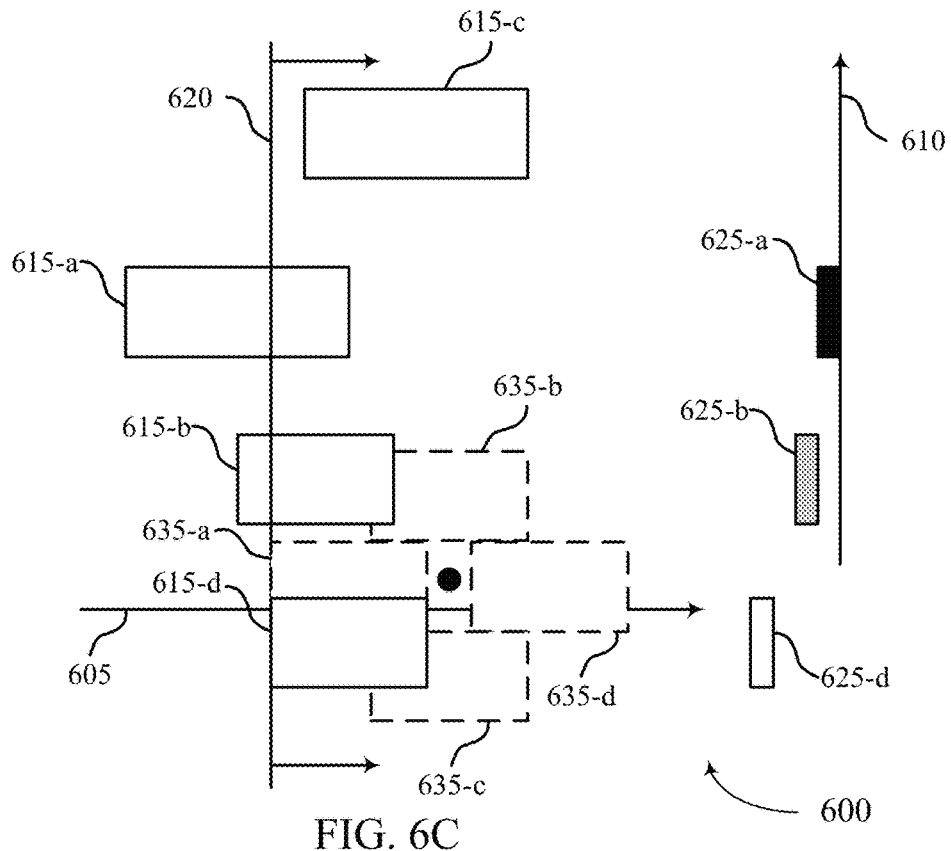

In FIG. 6C, additionally or alternatively to evaluating the remaining next best locations as shown in FIG. 6A, locations to the top, left, bottom, and right may be evaluated for relocating the fourth object 615-*d* (e.g., based on the fourth object 615-*d* overlapping a boundary, as opposed to overlapping another object). The locations 635 may be evaluated according to a sequence as described above with reference to FIGS. 4A-4D. In other cases, the system may perform an initial around-and-push algorithm prior to the beam sweep procedure, as discussed with reference to FIG. 2. For example, the locations 635 may be evaluated based on which boundary of the user interface the fourth object 615-*d* is crossing. For example, because object 615-*d* overlaps the lower boundary of the user interface, the system may reposition the fourth object 615-*d* to the right position (e.g., location 635-*d*). If object 615-*d* overlaps the top edge, the system may move object 615-*d* to the left position (e.g., location 635-*a*), if object 615-*d* overlaps the left edge, the system may move object 615-*d* to the bottom position (e.g., location 635-*c*), and if object 615-*d* overlaps the right edge, the system may move object 615-*d* to the top position (e.g., location 635-*b*). These movements are given as examples in a counter-clockwise checking procedure (e.g., the system may check the top edge, then the left, then the bottom, and then the right). Other procedures are possible, including a clockwise checking procedure.

Figure 6D:
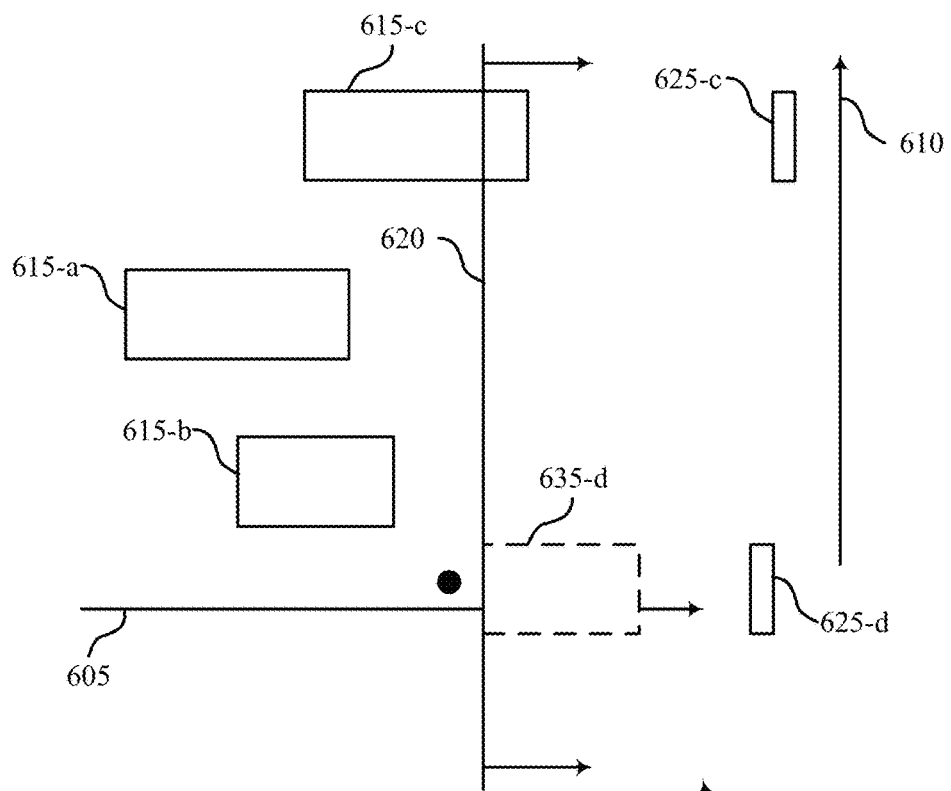
Figure 6E:
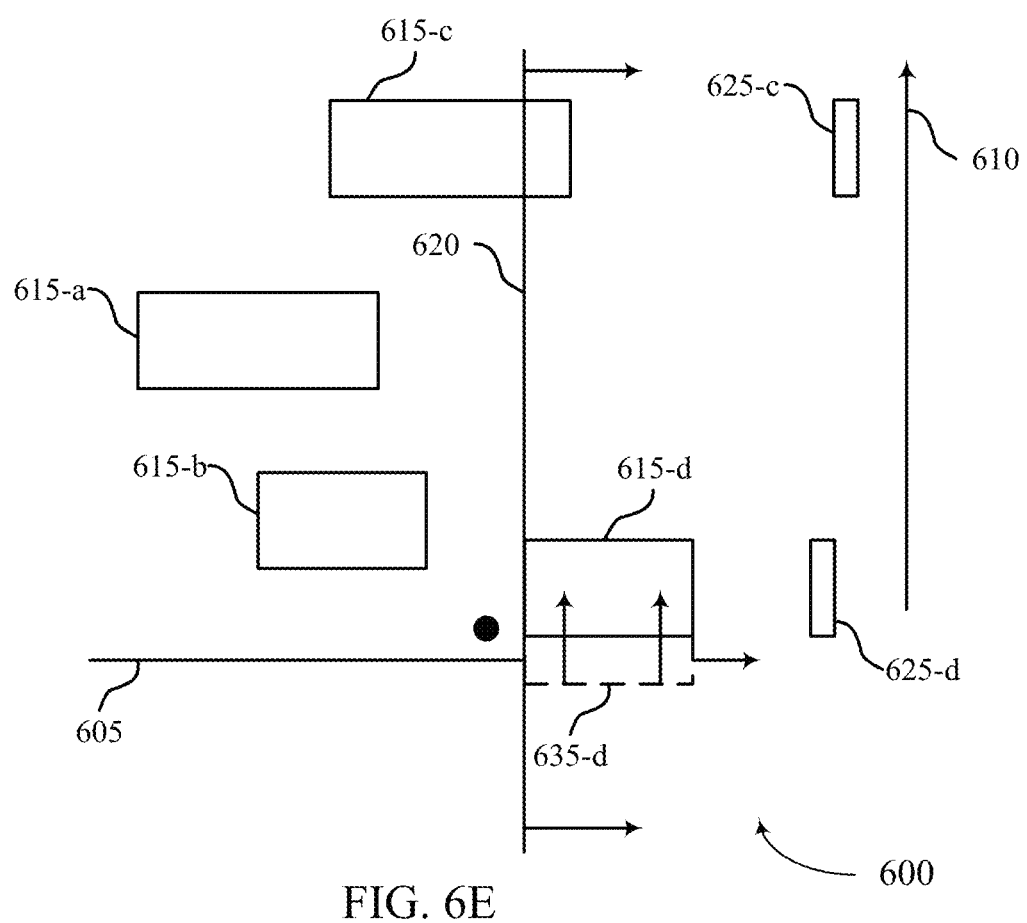

In FIG. 6D, the system may move object 615-*d* to location 635-*d* (e.g., the position to the right of the data point) based on the object 615-*d* overlapping with the bottom edge of the graph or user interface. However, the object 615-*d* may still overlap the edge of the graph or user interface (e.g., a portion of the interval 625-*d* remains outside the bottom edge). In FIG. 6E, because the selected location 635-*d* falls outside of the boundaries of the user interface, the fourth object 615-*d* may be pushed up into the area of the user interface (e.g., the chart area). The direction that the object is pushed may be based on the boundary that the object overlaps. The fourth object 615-*d* may be moved into the user interface a predetermined or dynamic amount of space (e.g., a set number of pixels), where this new location for the fourth object 615-*d* may border the boundary of the user interface or may be positioned such that a buffer exists between the fourth object 615-*d* and the boundary. In these cases, the interval 625-*d* for this new position may no longer overlap with the bottom edge of the graph or user interface. This moved and pushed position for the object 615-*d* may be used for the sweep procedure. For example, the edges for this new position may be added to a priority queue or sorted array for the sweep procedure, and this interval 625-*d* may be used for determining object overlap.

Figure 7:
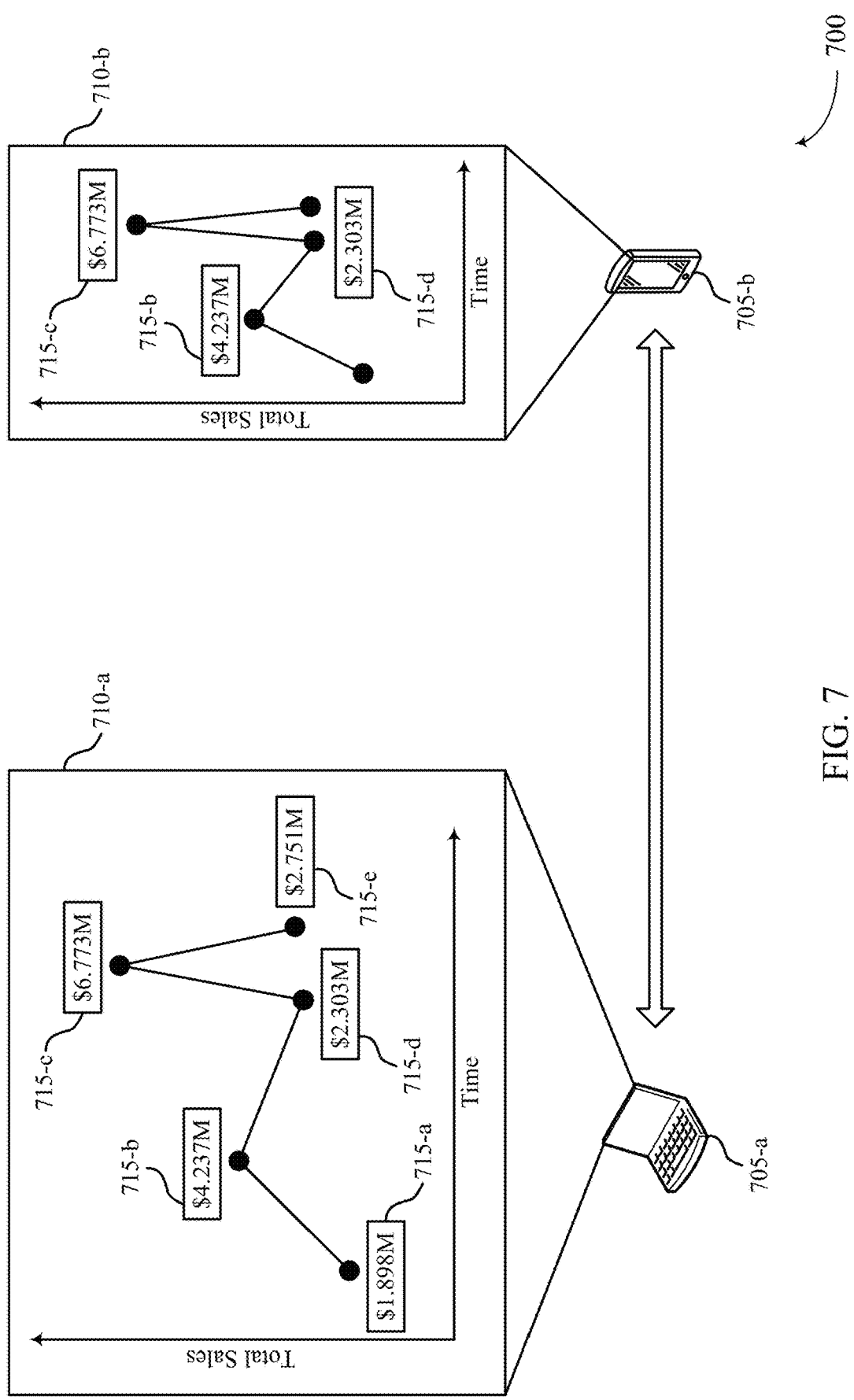
FIG. 7 illustrates an example of a user interface resizing that supports modifying default display configurations for objects in a user interface in accordance with aspects of the present disclosure.

FIG. 7 illustrates an example of a user interface resizing 700 that supports modifying default display configurations for objects in a user interface in accordance with aspects of the present disclosure. Different user devices 705 may include different size displays and user interfaces. For example, a first user device 705-*a* may have a first user interface 710-*a* that is larger than a second user interface 710-*b* associated with a second user device 705-*b*.

Based on the smaller user interface 710-*b*, one or more objects 715 may be affected. User interface 710-*a* may draw objects 715-*a*, 715-*b*, 715-*c*, 715-*d*, and 715-*e*. However, when the same display is shrunk down to fit in user interface 710-*b*, objects 715-*a* and 715-*e* may be left out (e.g., hidden or not drawn) based on not fitting or overlapping with other objects 715. Additionally, when the display is resized, a quick worst-case calculation may first be performed to determine if enough room is available for fitting the objects 715 based on a minimum size for the objects 715. If the calculation indicates there is not enough room (i.e., resources for display, such as pixels), none of the objects 715 may be drawn. If the calculation indicates there is enough room, then a sweeping procedure as described above may be performed to determine any overlaps and, accordingly, mitigate any overlaps identified.

Additionally or alternatively, individual displays in a user interface 710 may be resized based on an input by a user. For example, the user may resize a display based on a preference, fitting additional displays in the user interface 710, etc. Each time a display is resized, the worst-case calculation may be performed. If the worst-case calculation indicates there is enough room to draw the objects 715, default locations may then be determined for each object 715 as described above with reference to FIGS. 4A-4D. After the default locations are determined, the sweeping procedure may begin to identify and mitigate any display issues (e.g., overlapping objects, objects falling outside of the display, etc.). In some cases, the displays in the user interface 710 may be updated dynamically. For example, data points may be added to the display, data points may be removed from the display, data points may be changed in the display, etc. Based on the dynamic updates, the size of the display may change and/or default locations for one or more objects 715 may change. Accordingly, the worst-case calculation and default location determinations may be performed each time the data is dynamically updated. This may support a sweep procedure occurring in pseudo-real time if updates to the underlying data also occur in psuedo-real time. As such, the sweep procedure described above may be performed dynamically for chart, graphs, dashboards, or other displays that update dynamically.

Although line graphs are shown in the examples of FIGS. 2 and 7, it is to be understood that any type of graph or chart may be utilized when determining overlapping objects (e.g., labels). For example, multi-line charts, bar charts, combo-charts (e.g., line and bar chart), pie charts, or any other types of charts may have corresponding objects to display for the associated data illustrated in the chart. The sweeping procedure may be utilized accordingly when determining and drawing the objects for each type of chart (e.g., to aid in data label visualization).

Figure 8:
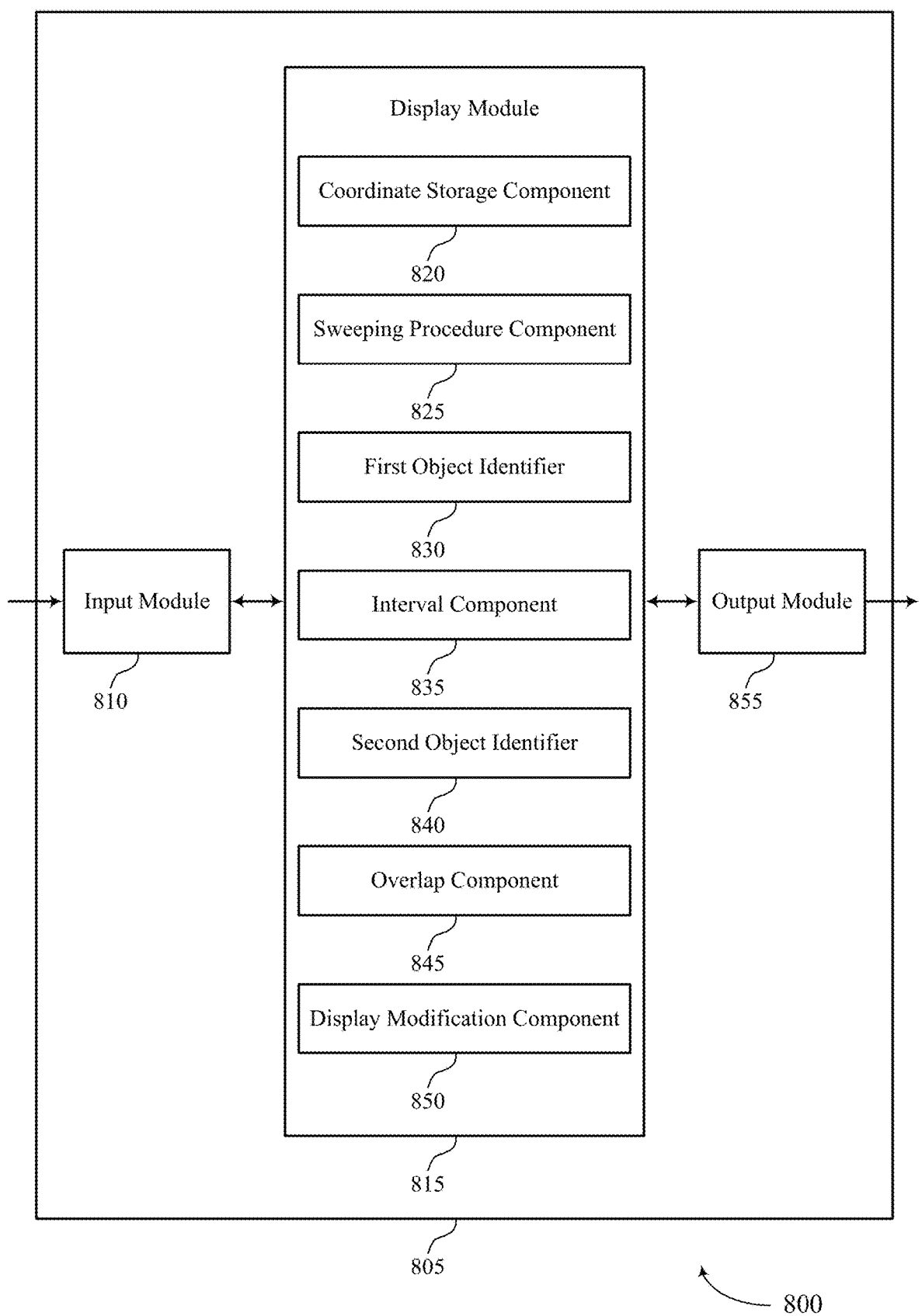
FIG. 8 shows a block diagram of an apparatus that supports modifying default display configurations for objects in a user interface in accordance with aspects of the present disclosure.

FIG. 8 shows a block diagram 800 of a device 805 that supports modifying default display configurations for objects in a user interface in accordance with aspects of the present disclosure. The device 805 may include an input module 810, a display module 815, and an output module 855. The device 805 may also include a processor. Each of these components may be in communication with one another (e.g., via one or more buses).

The input module 810 may manage input signals for the apparatus 805. For example, the input module 810 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the apparatus 805 for processing. For example, the input module 810 may transmit input signals to the display module 815 to support automatically modifying how a set of objects is displayed in a user interface. In some cases, the input module 810 may be a component of an input/output (I/O) controller 1015 as described with reference to FIG. 10.

The display module 815 may include a coordinate storage component 820, a sweeping procedure component 825, a first object identifier 830, an interval component 835, a second object identifier 840, an overlap component 845, and a display modification component 850. The display module 815 may be an example of aspects of the display module 1010 described herein.

The display module 815 and/or at least some of its various sub-components may be implemented in hardware, software executed by a processor, firmware, or any combination thereof. If implemented in software executed by a processor, the functions of the display module 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The display module 815 and/or at least some of its various sub-components may be physically located at various positions, including being distributed such that portions of functions are implemented at different physical locations by one or more physical devices. In some examples, the display module 815 and/or at least some of its various sub-components may be a separate and distinct component in accordance with various aspects of the present disclosure. In other examples, the display module 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The coordinate storage component 820 may store, in a list in memory for the set of objects, a start coordinate for each object in a first dimension and an end coordinate for each object in the first dimension, where the start coordinate and the end coordinate correspond to a default display configuration for each respective object.

The sweeping procedure component 825 may perform a sweep of values in the first dimension according to a set of rules.

The first object identifier 830 may identify, based on the list in memory, a start coordinate in the first dimension for a first object of the set of objects.

The interval component 835 may store an interval in a second dimension corresponding to the start coordinate in the first dimension for the first object.

The second object identifier 840 may identify, based on the list in memory, a start coordinate in the first dimension for a second object of the set of objects, where the start coordinate in the first dimension for the second object is equal to or follows the start coordinate in the first dimension for the first object and is equal to or precedes an end coordinate in the first dimension for the first object according to the sweep of values in the first dimension.

The overlap component 845 may determine an overlap between the stored interval in the second dimension for the first object and an interval in the second dimension corresponding to the start coordinate in the first dimension for the second object.

The display modification component 850 may modify the default display configuration for the second object based on determining the overlap.

The output module 855 may manage output signals for the device 805. For example, the output module 855 may receive signals from other components of the device 805, such as the display module 815, and may transmit these signals to other components or devices. In some specific examples, the output module 855 may transmit output signals for display in a user interface, for storage in a database or data store, for further processing at a server or server cluster, or for any other processes at any number of devices or systems. In some cases, the output module 855 may be a component of an I/O controller 1015 as described with reference to FIG. 10.

Figure 9:
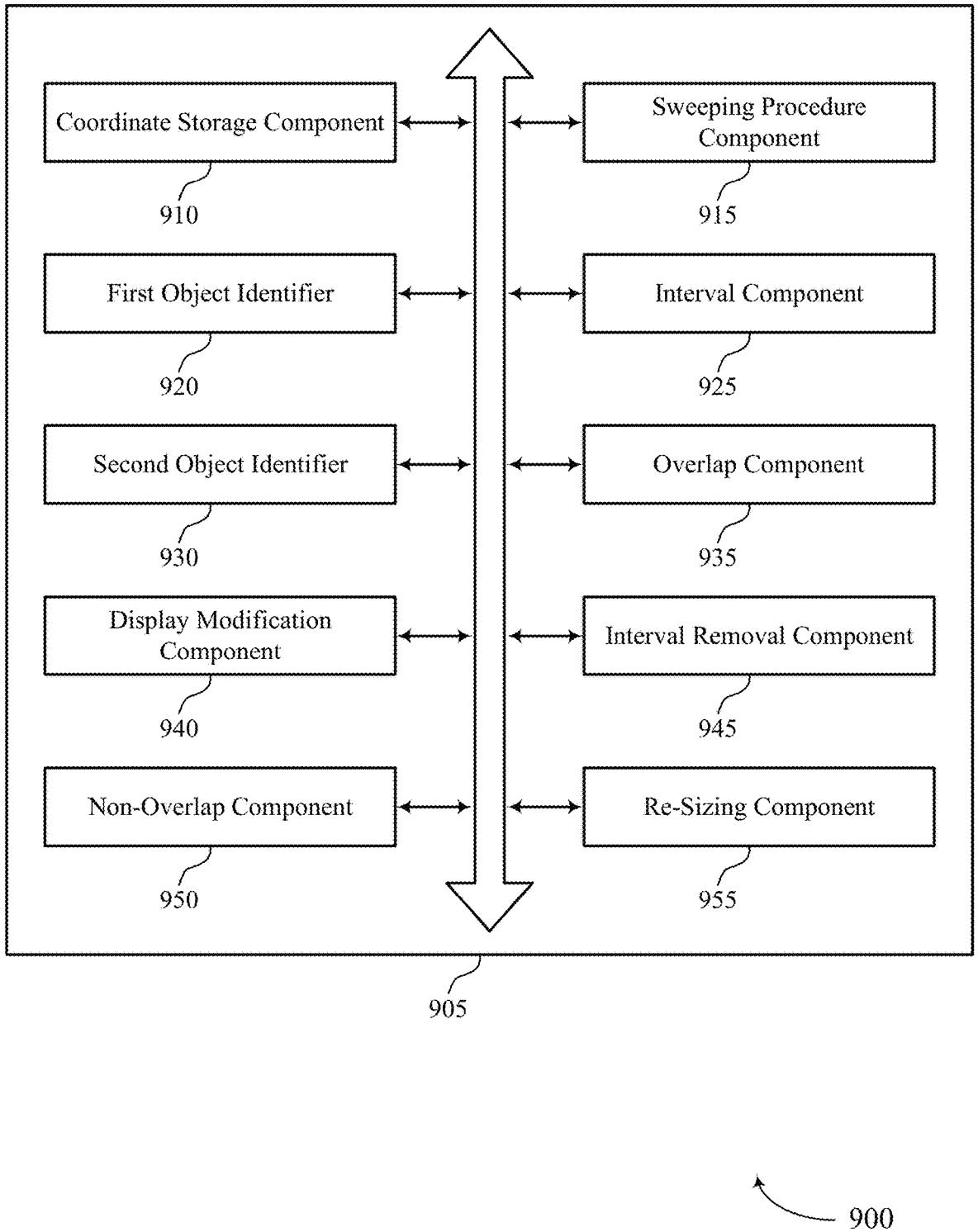
FIG. 9 shows a block diagram of a display module that supports modifying default display configurations for objects in a user interface in accordance with aspects of the present disclosure.

FIG. 9 shows a block diagram 900 of a display module 905 that supports modifying default display configurations for objects in a user interface in accordance with aspects of the present disclosure. The display module 905 may be an example of aspects of a display module 815 or a display module 1010 described herein. The display module 905 may include a coordinate storage component 910, a sweeping procedure component 915, a first object identifier 920, an interval component 925, a second object identifier 930, an overlap component 935, a display modification component 940, an interval removal component 945, a non-overlap component 950, and a re-sizing component 955. Each of these modules may communicate, directly or indirectly, with one another (e.g., via one or more buses).

The coordinate storage component 910 may store, in a list in memory for the set of objects, a start coordinate for each object in a first dimension and an end coordinate for each object in the first dimension, where the start coordinate and the end coordinate correspond to a default display configuration for each respective object. In some examples, the coordinate storage component 910 may determine a default positioning for each object of the set of objects in the user interface, where the start coordinate for each object in the first dimension, the end coordinate for each object in the first dimension, and an interval for each object in the second dimension correspond to the default positioning.

In some cases, the coordinate storage component 910 may determine a change to the set of objects, the default positioning for at least one object of the set of objects, or a combination thereof. Accordingly, the coordinate storage component 910 may re-calculate the default positioning for each object of the set of objects in the user interface based on the change and may perform a sweep of values according to the re-calculated default positioning for each object of the set of objects.

In some cases, the user interface includes a graph for display. Additionally, the set of objects includes labels on the graph, where the start coordinate for each object in the first dimension, the end coordinate for each object in the first dimension, and an interval for each object in the second dimension correspond to underlying data for the graph, a size of the graph, or a combination thereof. In some cases, the graph may include a line graph, a multi-line chart, a bar chart, a combo-chart, a pie chart, or a combination thereof.

The sweeping procedure component 915 may perform a sweep of values in the first dimension according to a set of rules, where performing the sweep of values includes one or more of the following functions. In some examples, the sweeping procedure component 915 may increment a reference value in the first dimension from a last start coordinate or end coordinate for the set of objects to a next start coordinate or end coordinate for the set of objects.

The first object identifier 920 may identify, based on the list in memory, a start coordinate in the first dimension for a first object of the set of objects. Additionally, the interval component 925 may store an interval in a second dimension corresponding to the start coordinate in the first dimension for the first object. In some cases, the stored interval in the second dimension for the first object is stored in a set of intervals in memory. For example, the set of intervals in memory includes an interval search tree, a binary search tree, or a combination thereof. Additionally, the list in memory includes a priority queue, a sorted array, or a combination thereof. In some cases, the first dimension is orthogonal to the second dimension.

The second object identifier 930 may identify, based on the list in memory, a start coordinate in the first dimension for a second object of the set of objects, where the start coordinate in the first dimension for the second object is equal to or follows the start coordinate in the first dimension for the first object and is equal to or precedes an end coordinate in the first dimension for the first object according to the sweep of values in the first dimension.

The overlap component 935 may determine an overlap between the stored interval in the second dimension for the first object and an interval in the second dimension corresponding to the start coordinate in the first dimension for the second object.

The display modification component 940 may modify the default display configuration for the second object based on determining the overlap. In some examples, the display modification component 940 may refrain from displaying the second object in the user interface based on determining the overlap. Additionally or alternatively, the display modification component 940 may determine a next best display configuration for the second object, where the next best display configuration includes a next best start coordinate in the first dimension, a next best end coordinate in the first dimension, and a next best interval in the second dimension. Accordingly, the display modification component 940 may replace, in the list in memory, the start coordinate in the first dimension for the second object with the next best start coordinate in the first dimension for the second object and the end coordinate in the first dimension for the second object with the next best end coordinate in the first dimension for the second object. In some cases, the start coordinate in the first dimension for the second object is equal to or precedes the next best start coordinate in the first dimension for the second object.

In some cases, the display modification component 940 may identify, based on the list in memory, the next best start coordinate in the first dimension for the second object.

Additionally, the display modification component 940 may determine whether the next best interval in the second dimension for the second object overlaps with any stored interval in the second dimension for the set of objects.

In some examples, the display modification component 940 may display, in the user interface, one or more objects of the set of objects, where the displaying is based on a default display configuration for one or more objects of the set of objects, a modified default display configuration for one or more objects of the set of objects, or a combination thereof.

The interval removal component 945 may identify, based on the list in memory, the end coordinate in the first dimension for the first object. In some examples, the interval removal component 945 may then remove from memory the stored interval in the second dimension for the first object based on identifying the end coordinate.

The non-overlap component 950 may identify, based on the list in memory, a start coordinate in the first dimension for a third object of the set of objects. In some examples, the non-overlap component 950 may determine that an interval in the second dimension corresponding to the start coordinate in the first dimension for the third object does not overlap with any stored interval in the second dimension for the set of objects. Additionally, the non-overlap component 950 may store the interval in the second dimension corresponding to the start coordinate in the first dimension for the third object based on determining that the interval for the third object does not overlap with any stored interval.

The re-sizing component 955 may re-size the user interface based on a user input, re-calculate the default positioning for each object of the set of objects in the user interface based on the re-sizing, and perform the sweep of values according to the re-calculated default positioning for each object of the set of objects. Additionally or alternatively, the re-sizing component 955 may re-size the user interface based on a user input, perform a worst-case scenario calculation based on the re-sized user interface and a size of the set of objects, and determine whether to refrain from displaying all objects of the set of objects in the user interface based on the worst-case scenario calculation.

Figure 10:
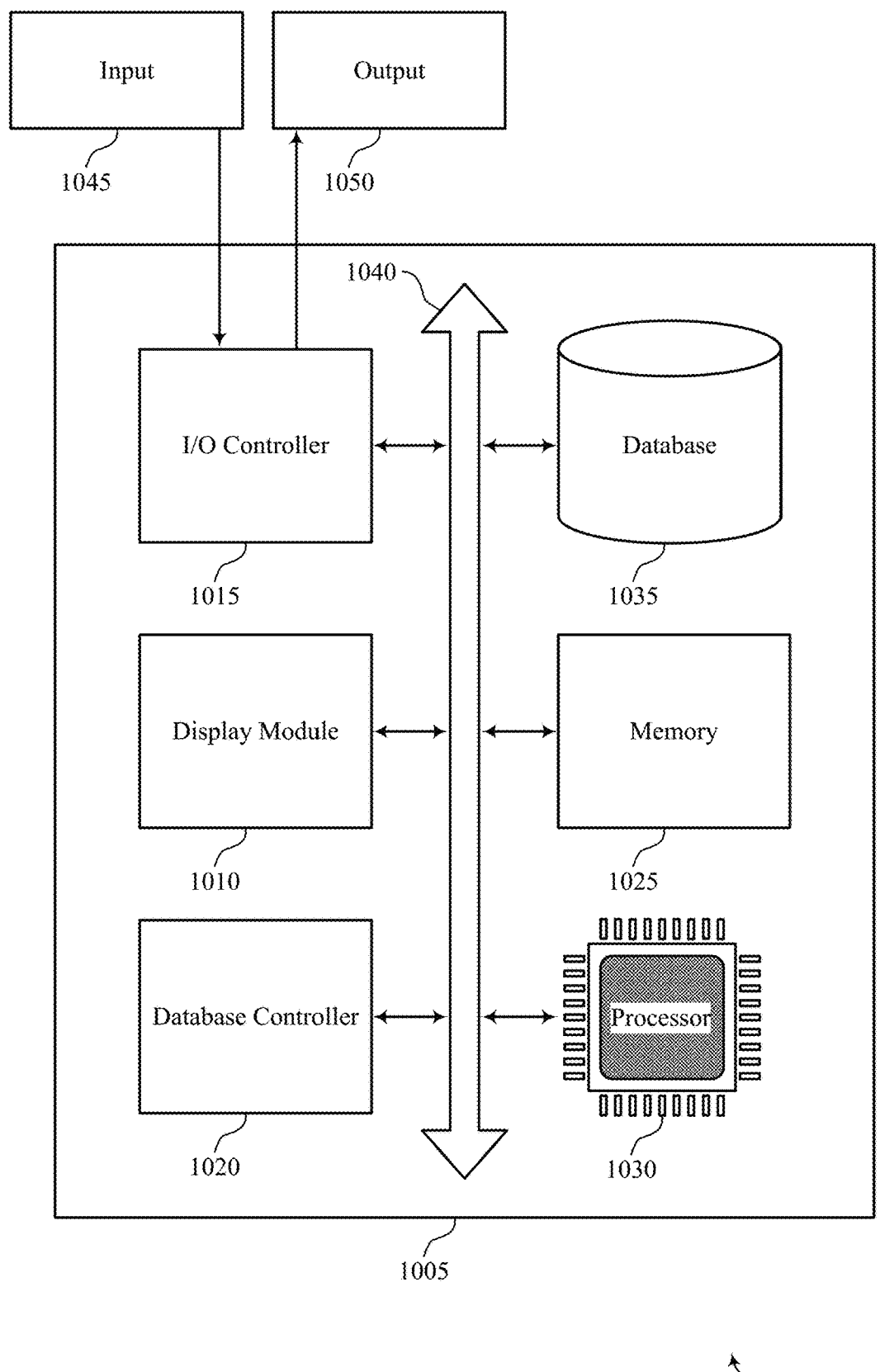
FIG. 10 shows a diagram of a system including a device that supports modifying default display configurations for objects in a user interface in accordance with aspects of the present disclosure.

FIG. 10 shows a diagram of a system 1000 including a device 1005 that supports modifying default display configurations for objects in a user interface in accordance with aspects of the present disclosure. The device 1005 may be an example of or include the components of a user device or a device 805 as described herein. The device 1005 may include components for bi-directional voice and data communications including components for transmitting and receiving communications, including a display module 1010, an I/O controller 1015, a database controller 1020, memory 1025, a processor 1030, and a database 1035. These components may be in electronic communication via one or more buses (e.g., bus 1040).

The display module 1010 may store, in a list in memory for the set of objects, a start coordinate for each object in a first dimension and an end coordinate for each object in the first dimension, where the start coordinate and the end coordinate correspond to a default display configuration for each respective object. Additionally, the display module 1010 may perform a sweep of values in the first dimension according to a set of rules. As part of the sweep of values, the display module 1010 may identify, based on the list in memory, a start coordinate in the first dimension for a first object of the set of objects, store an interval in a second dimension corresponding to the start coordinate in the first dimension for the first object, and identify, based on the list in memory, a start coordinate in the first dimension for a second object of the set of objects, where the start coordinate in the first dimension for the second object is equal to or follows the start coordinate in the first dimension for the first object and is equal to or precedes an end coordinate in the first dimension for the first object according to the sweep of values in the first dimension. In some cases, the display module 1010 may determine an overlap between the stored interval in the second dimension for the first object and an interval in the second dimension corresponding to the start coordinate in the first dimension for the second object. Accordingly, the display module 1010 may modify the default display configuration for the second object based on determining the overlap.

The I/O controller 1015 may manage input signals 1045 and output signals 1050 for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The database controller 1020 may manage data storage and processing in a database 1035. In some cases, a user may interact with the database controller 1020. In other cases, the database controller 1020 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor to perform various functions described herein. In some cases, the memory 1025 may contain, among other things, a basic input/output system (BIOS) which may control basic hardware or software operation such as the interaction with peripheral components or devices.

The processor 1030 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting migrating data between databases).

Figure 11:
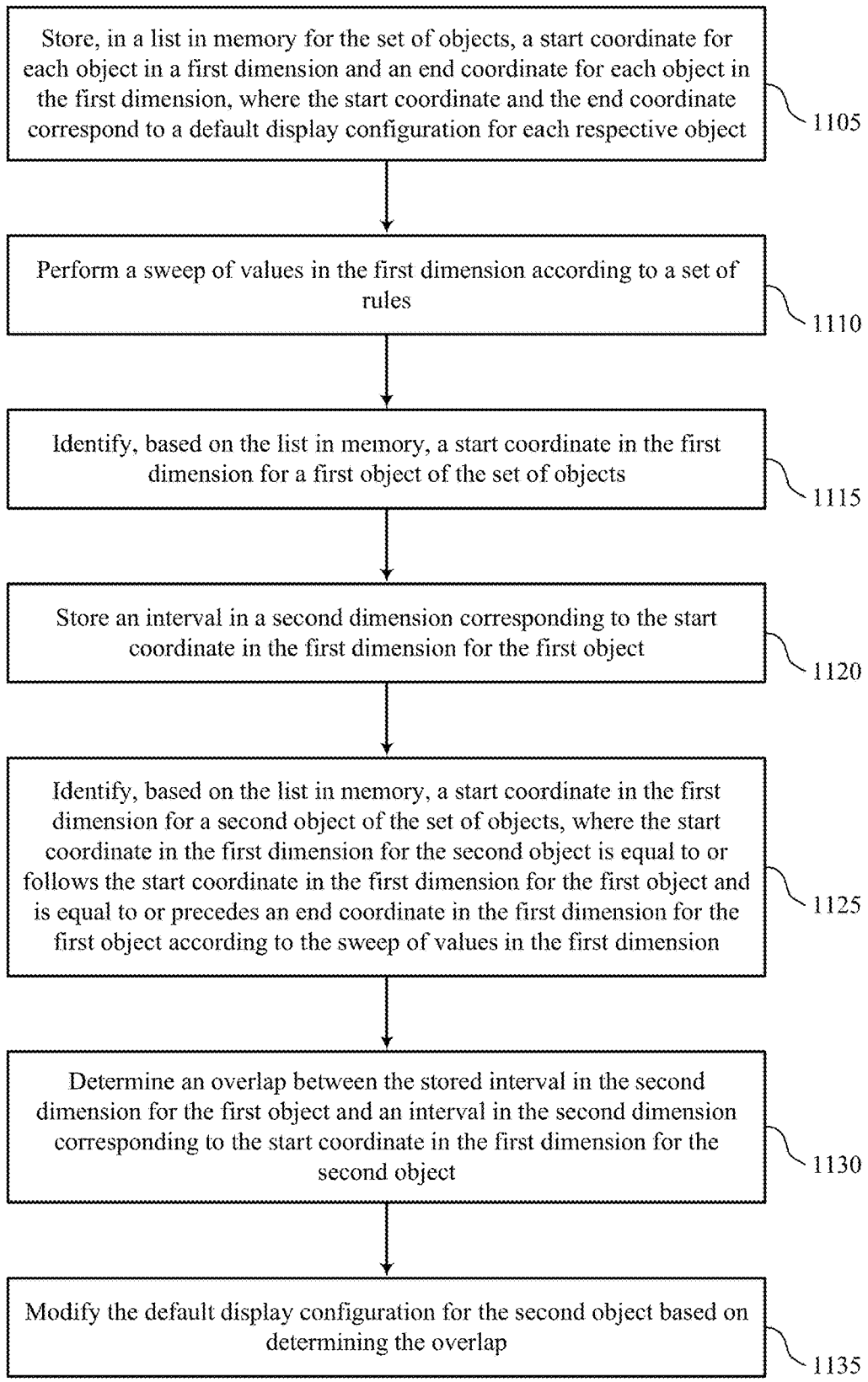
FIGS. 11 through 14 show flowcharts illustrating methods that support modifying default display configurations for objects in a user interface in accordance with aspects of the present disclosure.

FIG. 11 shows a flowchart illustrating a method 1100 that supports modifying default display configurations for objects in a user interface in accordance with aspects of the present disclosure. The operations of method 1100 may be implemented by a device (e.g., a user device, such as a desktop, a laptop, a mobile device, an internet of things (IoT) device, etc.) or its components as described herein. For example, the operations of method 1100 may be performed by a display module as described with reference to FIGS. 8 through 10. In some examples, a device may execute a set of instructions to control the functional elements of the device to perform the functions described below. Additionally or alternatively, a device may perform aspects of the functions described below using special-purpose hardware.

At 1105, the device may store, in a list in memory for a set of objects, a start coordinate for each object in a first dimension and an end coordinate for each object in the first dimension, where the start coordinate and the end coordinate correspond to a default display configuration for each respective object. The operations of 1105 may be performed according to the methods described herein. In some examples, aspects of the operations of 1105 may be performed by a coordinate storage component as described with reference to FIGS. 8 through 10.

At 1110, the device may perform a sweep of values in the first dimension according to a set of rules, where performing the sweep of values may include the processes described below with respect to steps 1115 through 1135. The operations of 1110 may be performed according to the methods described herein. In some examples, aspects of the operations of 1110 may be performed by a sweeping procedure component as described with reference to FIGS. 8 through 10.

At 1115, the device may identify, based on the list in memory, a start coordinate in the first dimension for a first object of the set of objects. The operations of 1115 may be performed according to the methods described herein. In some examples, aspects of the operations of 1115 may be performed by a first object identifier as described with reference to FIGS. 8 through 10.

At 1120, the device may store an interval in a second dimension corresponding to the start coordinate in the first dimension for the first object. The operations of 1120 may be performed according to the methods described herein. In some examples, aspects of the operations of 1120 may be performed by an interval component as described with reference to FIGS. 8 through 10.

At 1125, the device may identify, based on the list in memory, a start coordinate in the first dimension for a second object of the set of objects, where the start coordinate in the first dimension for the second object is equal to or follows the start coordinate in the first dimension for the first object and is equal to or precedes an end coordinate in the first dimension for the first object according to the sweep of values in the first dimension. The operations of 1125 may be performed according to the methods described herein. In some examples, aspects of the operations of 1125 may be performed by a second object identifier as described with reference to FIGS. 8 through 10.

At 1130, the device may determine an overlap between the stored interval in the second dimension for the first object and an interval in the second dimension corresponding to the start coordinate in the first dimension for the second object. The operations of 1130 may be performed according to the methods described herein. In some examples, aspects of the operations of 1130 may be performed by an overlap component as described with reference to FIGS. 8 through 10.

At 1135, the device may modify the default display configuration for the second object based on determining the overlap. The operations of 1135 may be performed according to the methods described herein. In some examples, aspects of the operations of 1135 may be performed by a display modification component as described with reference to FIGS. 8 through 10.

Figure 12:
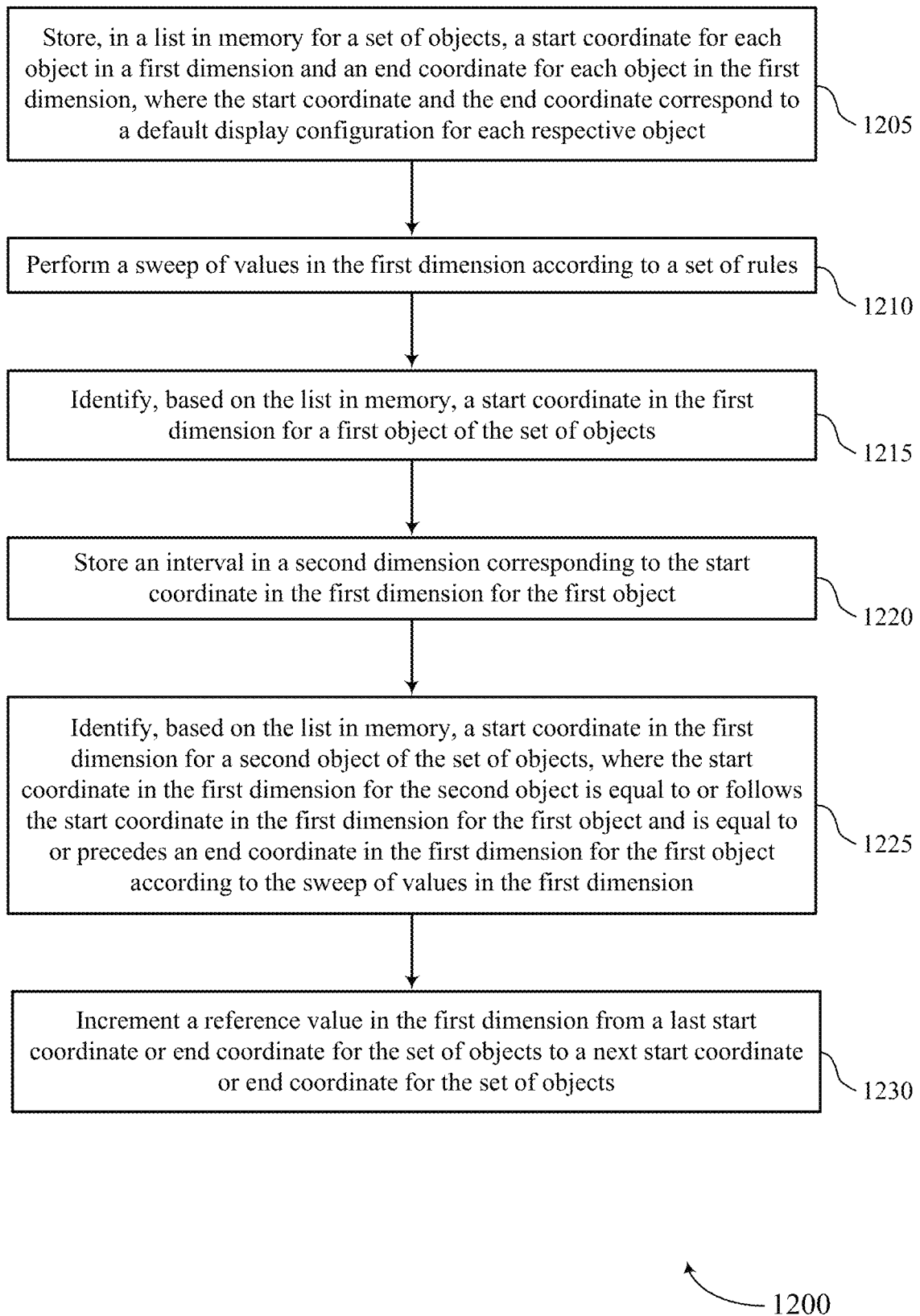

FIG. 12 shows a flowchart illustrating a method 1200 that supports modifying default display configurations for objects in a user interface in accordance with aspects of the present disclosure. The operations of method 1200 may be implemented by a device or its components as described herein. For example, the operations of method 1200 may be performed by a display module as described with reference to FIGS. 8 through 10. In some examples, a device may execute a set of instructions to control the functional elements of the device to perform the functions described below. Additionally or alternatively, a device may perform aspects of the functions described below using special-purpose hardware.

At 1205, the device may store, in a list in memory for a set of objects, a start coordinate for each object in a first dimension and an end coordinate for each object in the first dimension, where the start coordinate and the end coordinate correspond to a default display configuration for each respective object. The operations of 1205 may be performed according to the methods described herein. In some examples, aspects of the operations of 1205 may be performed by a coordinate storage component as described with reference to FIGS. 8 through 10.

At 1210, the device may perform a sweep of values in the first dimension according to a set of rules. The operations of 1210 may be performed according to the methods described herein. In some examples, aspects of the operations of 1210 may be performed by a sweeping procedure component as described with reference to FIGS. 8 through 10.

At 1215, the device may identify, based on the list in memory, a start coordinate in the first dimension for a first object of the set of objects. The operations of 1215 may be performed according to the methods described herein. In some examples, aspects of the operations of 1215 may be performed by a first object identifier as described with reference to FIGS. 8 through 10.

At 1220, the device may store an interval in a second dimension corresponding to the start coordinate in the first dimension for the first object. The operations of 1220 may be performed according to the methods described herein. In some examples, aspects of the operations of 1220 may be performed by an interval component as described with reference to FIGS. 8 through 10.

At 1225, the device may identify, based on the list in memory, a start coordinate in the first dimension for a second object of the set of objects, where the start coordinate in the first dimension for the second object is equal to or follows the start coordinate in the first dimension for the first object and is equal to or precedes an end coordinate in the first dimension for the first object according to the sweep of values in the first dimension. The operations of 1225 may be performed according to the methods described herein. In some examples, aspects of the operations of 1225 may be performed by a second object identifier as described with reference to FIGS. 8 through 10.

At 1230, the device may increment a reference value in the first dimension from a last start coordinate or end coordinate for the set of objects to a next start coordinate or end coordinate for the set of objects. The operations of 1230 may be performed according to the methods described herein. In some examples, aspects of the operations of 1230 may be performed by a sweeping procedure component as described with reference to FIGS. 8 through 10.

Figure 13:
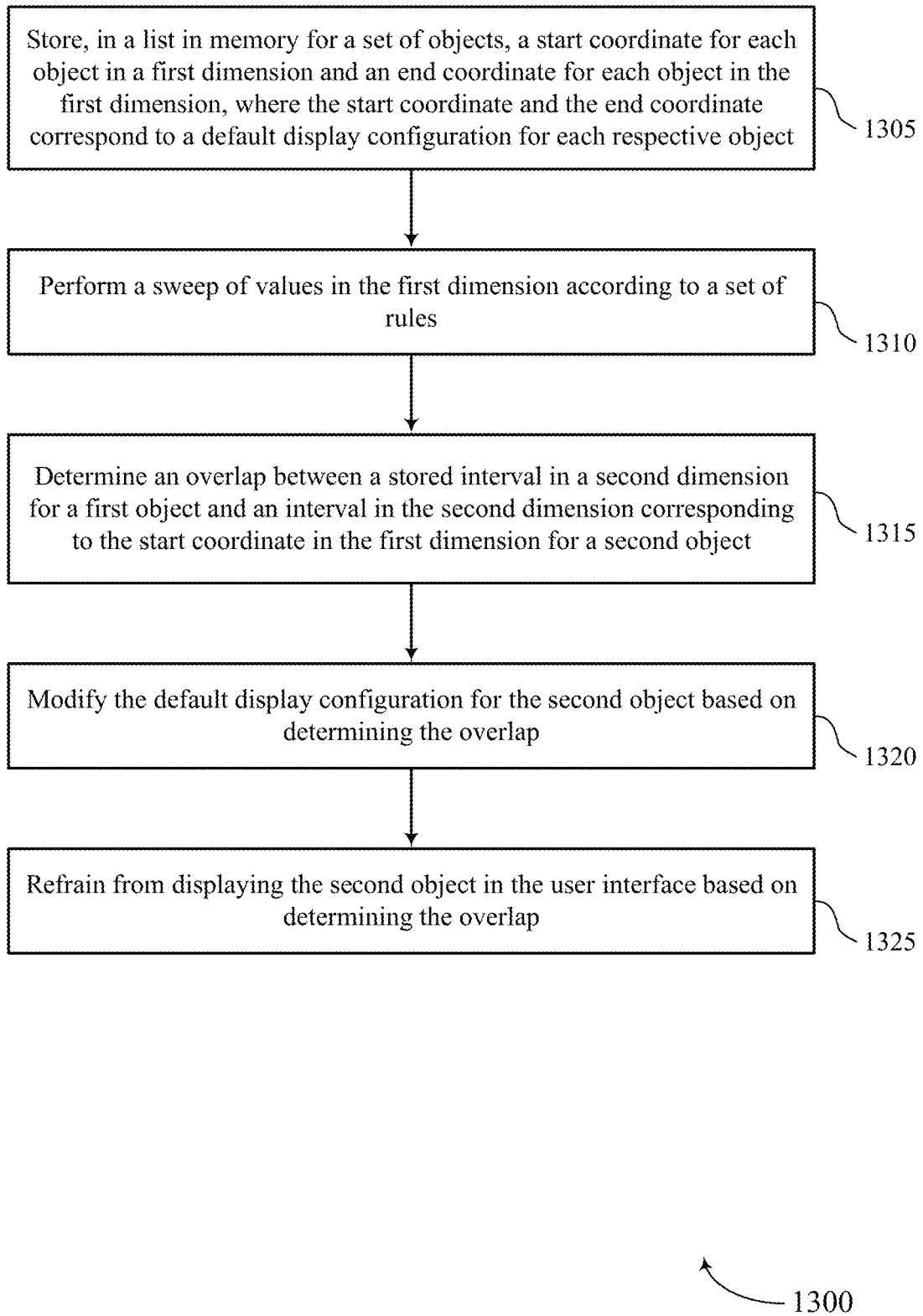

FIG. 13 shows a flowchart illustrating a method 1300 that supports modifying default display configurations for objects in a user interface in accordance with aspects of the present disclosure. The operations of method 1300 may be implemented by a device or its components as described herein. For example, the operations of method 1300 may be performed by a display module as described with reference to FIGS. 8 through 10. In some examples, a device may execute a set of instructions to control the functional elements of the device to perform the functions described below. Additionally or alternatively, a device may perform aspects of the functions described below using special-purpose hardware.

At 1305, the device may store, in a list in memory for a set of objects, a start coordinate for each object in a first dimension and an end coordinate for each object in the first dimension, where the start coordinate and the end coordinate correspond to a default display configuration for each respective object. The operations of 1305 may be performed according to the methods described herein. In some examples, aspects of the operations of 1305 may be performed by a coordinate storage component as described with reference to FIGS. 8 through 10.

At 1310, the device may perform a sweep of values in the first dimension according to a set of rules. The operations of 1310 may be performed according to the methods described herein. In some examples, aspects of the operations of 1310 may be performed by a sweeping procedure component as described with reference to FIGS. 8 through 10.

At 1315, the device may determine an overlap between a stored interval in a second dimension for a first object and an interval in the second dimension corresponding to the start coordinate in the first dimension for a second object. The operations of 1315 may be performed according to the methods described herein. In some examples, aspects of the operations of 1315 may be performed by an overlap component as described with reference to FIGS. 8 through 10.

At 1320, the device may modify the default display configuration for the second object based on determining the overlap. The operations of 1320 may be performed according to the methods described herein. In some examples, aspects of the operations of 1320 may be performed by a display modification component as described with reference to FIGS. 8 through 10.

At 1325, the device may refrain from displaying the second object in the user interface based on determining the overlap. The operations of 1325 may be performed according to the methods described herein. In some examples, aspects of the operations of 1325 may be performed by a display modification component as described with reference to FIGS. 8 through 10.

Figure 14:
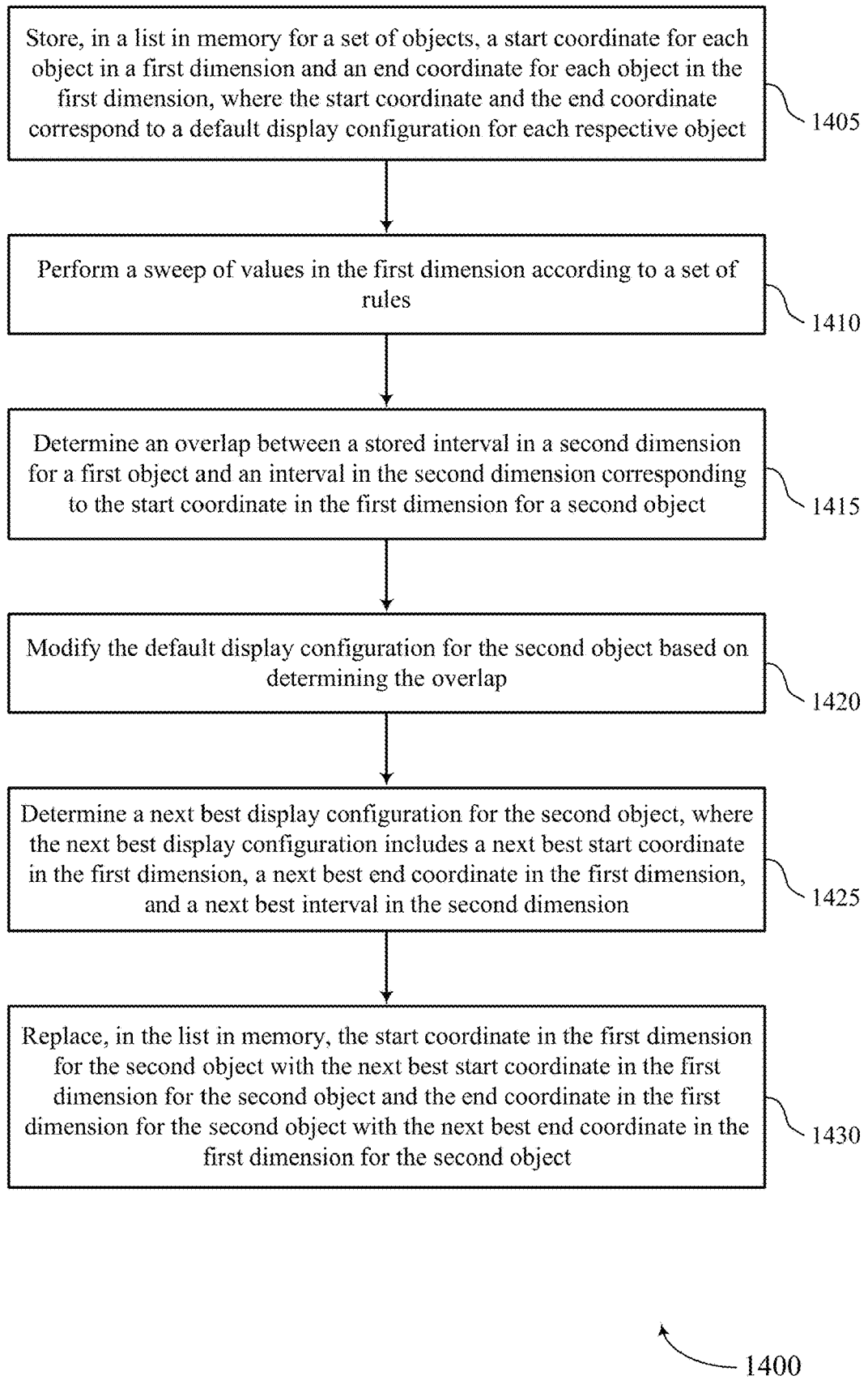

FIG. 14 shows a flowchart illustrating a method 1400 that supports modifying default display configurations for objects in a user interface in accordance with aspects of the present disclosure. The operations of method 1400 may be implemented by a device or its components as described herein. For example, the operations of method 1400 may be performed by a display module as described with reference to FIGS. 8 through 10. In some examples, a device may execute a set of instructions to control the functional elements of the device to perform the functions described below. Additionally or alternatively, a device may perform aspects of the functions described below using special-purpose hardware.

At 1405, the device may store, in a list in memory for a set of objects, a start coordinate for each object in a first dimension and an end coordinate for each object in the first dimension, where the start coordinate and the end coordinate correspond to a default display configuration for each respective object. The operations of 1405 may be performed according to the methods described herein. In some examples, aspects of the operations of 1405 may be performed by a coordinate storage component as described with reference to FIGS. 8 through 10.

At 1410, the device may perform a sweep of values in the first dimension according to a set of rules. The operations of 1410 may be performed according to the methods described herein. In some examples, aspects of the operations of 1410 may be performed by a sweeping procedure component as described with reference to FIGS. 8 through 10.

At 1415, the device may determine an overlap between a stored interval in a second dimension for a first object and an interval in the second dimension corresponding to a start coordinate in a first dimension for a second object. The operations of 1415 may be performed according to the methods described herein. In some examples, aspects of the operations of 1415 may be performed by an overlap component as described with reference to FIGS. 8 through 10.

At 1420, the device may modify the default display configuration for the second object based on determining the overlap. The operations of 1420 may be performed according to the methods described herein. In some examples, aspects of the operations of 1420 may be performed by a display modification component as described with reference to FIGS. 8 through 10.

At 1425, the device may determine a next best display configuration for the second object, where the next best display configuration includes a next best start coordinate in the first dimension, a next best end coordinate in the first dimension, and a next best interval in the second dimension. The operations of 1425 may be performed according to the methods described herein. In some examples, aspects of the operations of 1425 may be performed by a display modification component as described with reference to FIGS. 8 through 10.

At 1430, the device may replace, in the list in memory, the start coordinate in the first dimension for the second object with the next best start coordinate in the first dimension for the second object and the end coordinate in the first dimension for the second object with the next best end coordinate in the first dimension for the second object. The operations of 1430 may be performed according to the methods described herein. In some examples, aspects of the operations of 1430 may be performed by a display modification component as described with reference to FIGS. 8 through 10.

A method for automatically modifying how a set of objects is displayed in a user interface is described. The method may include storing, in a list in memory for the set of objects, a start coordinate for each object in a first dimension and an end coordinate for each object in the first dimension, where the start coordinate and the end coordinate correspond to a default display configuration for each respective object, and performing a sweep of values in the first dimension according to a set of rules. Performing the sweep of values may include identifying, based on the list in memory, a start coordinate in the first dimension for a first object of the set of objects, storing an interval in a second dimension corresponding to the start coordinate in the first dimension for the first object, identifying, based on the list in memory, a start coordinate in the first dimension for a second object of the set of objects, where the start coordinate in the first dimension for the second object is equal to or follows the start coordinate in the first dimension for the first object and is equal to or precedes an end coordinate in the first dimension for the first object according to the sweep of values in the first dimension, determining an overlap between the stored interval in the second dimension for the first object and an interval in the second dimension corresponding to the start coordinate in the first dimension for the second object, and modifying the default display configuration for the second object based on determining the overlap.

An apparatus for automatically modifying how a set of objects is displayed in a user interface is described. The apparatus may include a processor, memory in electronic communication with the processor, and instructions stored in the memory. The instructions may be executable by the processor to cause the apparatus to store, in a list in memory for the set of objects, a start coordinate for each object in a first dimension and an end coordinate for each object in the first dimension, where the start coordinate and the end coordinate correspond to a default display configuration for each respective object, and perform a sweep of values in the first dimension according to a set of rules. Performing the sweep of values may include identifying, based on the list in memory, a start coordinate in the first dimension for a first object of the set of objects, storing an interval in a second dimension corresponding to the start coordinate in the first dimension for the first object, identifying, based on the list in memory, a start coordinate in the first dimension for a second object of the set of objects, where the start coordinate in the first dimension for the second object is equal to or follows the start coordinate in the first dimension for the first object and is equal to or precedes an end coordinate in the first dimension for the first object according to the sweep of values in the first dimension, determining an overlap between the stored interval in the second dimension for the first object and an interval in the second dimension corresponding to the start coordinate in the first dimension for the second object, and modifying the default display configuration for the second object based on determining the overlap.

Another apparatus for automatically modifying how a set of objects is displayed in a user interface is described. The apparatus may include means for storing, in a list in memory for the set of objects, a start coordinate for each object in a first dimension and an end coordinate for each object in the first dimension, where the start coordinate and the end coordinate correspond to a default display configuration for each respective object, and means for performing a sweep of values in the first dimension according to a set of rules. The means for performing the sweep of values may include means for identifying, based on the list in memory, a start coordinate in the first dimension for a first object of the set of objects, storing an interval in a second dimension corresponding to the start coordinate in the first dimension for the first object, identifying, based on the list in memory, a start coordinate in the first dimension for a second object of the set of objects, where the start coordinate in the first dimension for the second object is equal to or follows the start coordinate in the first dimension for the first object and is equal to or precedes an end coordinate in the first dimension for the first object according to the sweep of values in the first dimension, determining an overlap between the stored interval in the second dimension for the first object and an interval in the second dimension corresponding to the start coordinate in the first dimension for the second object, and modifying the default display configuration for the second object based on determining the overlap.

A non-transitory computer-readable medium storing code for automatically modifying how a set of objects is displayed in a user interface is described. The code may include instructions executable by a processor to store, in a list in memory for the set of objects, a start coordinate for each object in a first dimension and an end coordinate for each object in the first dimension, where the start coordinate and the end coordinate correspond to a default display configuration for each respective object, and perform a sweep of values in the first dimension according to a set of rules. Performing the sweep of values may include identifying, based on the list in memory, a start coordinate in the first dimension for a first object of the set of objects, storing an interval in a second dimension corresponding to the start coordinate in the first dimension for the first object, identifying, based on the list in memory, a start coordinate in the first dimension for a second object of the set of objects, where the start coordinate in the first dimension for the second object is equal to or follows the start coordinate in the first dimension for the first object and is equal to or precedes an end coordinate in the first dimension for the first object according to the sweep of values in the first dimension, determining an overlap between the stored interval in the second dimension for the first object and an interval in the second dimension corresponding to the start coordinate in the first dimension for the second object, and modifying the default display configuration for the second object based on determining the overlap.

In some examples of the method, apparatuses, and non-transitory computer-readable medium described herein, performing the sweep of values may include operations, features, means, or instructions for incrementing a reference value in the first dimension from a last start coordinate or end coordinate for the set of objects to a next start coordinate or end coordinate for the set of objects.

In some examples of the method, apparatuses, and non-transitory computer-readable medium described herein, performing the sweep of values further may include operations, features, means, or instructions for identifying, based on the list in memory, the end coordinate in the first dimension for the first object and removing from memory the stored interval in the second dimension for the first object based on identifying the end coordinate.

In some examples of the method, apparatuses, and non-transitory computer-readable medium described herein, performing the sweep of values further may include operations, features, means, or instructions for identifying, based on the list in memory, a start coordinate in the first dimension for a third object of the set of objects, determining that an interval in the second dimension corresponding to the start coordinate in the first dimension for the third object does not overlap with any stored interval in the second dimension for the set of objects and storing the interval in the second dimension corresponding to the start coordinate in the first dimension for the third object based on determining that the interval for the third object does not overlap with any stored interval.

In some examples of the method, apparatuses, and non-transitory computer-readable medium described herein, modifying the default display configuration may include operations, features, means, or instructions for refraining from displaying the second object in the user interface based on determining the overlap.

In some examples of the method, apparatuses, and non-transitory computer-readable medium described herein, modifying the default display configuration may include operations, features, means, or instructions for determining a next best display configuration for the second object, where the next best display configuration includes a next best start coordinate in the first dimension, a next best end coordinate in the first dimension, and a next best interval in the second dimension and replacing, in the list in memory, the start coordinate in the first dimension for the second object with the next best start coordinate in the first dimension for the second object and the end coordinate in the first dimension for the second object with the next best end coordinate in the first dimension for the second object.

In some examples of the method, apparatuses, and non-transitory computer-readable medium described herein, the start coordinate in the first dimension for the second object may be equal to or precedes the next best start coordinate in the first dimension for the second object.

In some examples of the method, apparatuses, and non-transitory computer-readable medium described herein, performing the sweep of values may include operations, features, means, or instructions for identifying, based on the list in memory, the next best start coordinate in the first dimension for the second object and determining whether the next best interval in the second dimension for the second object overlaps with any stored interval in the second dimension for the set of objects.

Some examples of the method, apparatuses, and non-transitory computer-readable medium described herein may further include operations, features, means, or instructions for displaying, in the user interface, one or more objects of the set of objects, where the displaying may be based on a default display configuration for one or more objects of the set of objects, a modified default display configuration for one or more objects of the set of objects, or a combination thereof.

In some examples of the method, apparatuses, and non-transitory computer-readable medium described herein, storing the start coordinate for each object in the first dimension and the end coordinate for each object in the first dimension further may include operations, features, means, or instructions for determining a default positioning for each object of the set of objects in the user interface, where the start coordinate for each object in the first dimension, the end coordinate for each object in the first dimension, and an interval for each object in the second dimension correspond to the default positioning.

Some examples of the method, apparatuses, and non-transitory computer-readable medium described herein may further include operations, features, means, or instructions for re-sizing the user interface based on a user input, re-calculating the default positioning for each object of the set of objects in the user interface based on the re-sizing and performing the sweep of values according to the re-calculated default positioning for each object of the set of objects.

Some examples of the method, apparatuses, and non-transitory computer-readable medium described herein may further include operations, features, means, or instructions for determining a change to the set of objects, the default positioning for at least one object of the set of objects, or a combination thereof, re-calculating the default positioning for each object of the set of objects in the user interface based on the change and performing the sweep of values according to the re-calculated default positioning for each object of the set of objects.

Some examples of the method, apparatuses, and non-transitory computer-readable medium described herein may further include operations, features, means, or instructions for re-sizing the user interface based on a user input, performing a worst-case scenario calculation based on the re-sized user interface and a size of the set of objects and determining whether to refrain from displaying all objects of the set of objects in the user interface based on the worst-case scenario calculation.

In some examples of the method, apparatuses, and non-transitory computer-readable medium described herein, the stored interval in the second dimension for the first object may be stored in a set of intervals in memory.

In some examples of the method, apparatuses, and non-transitory computer-readable medium described herein, the set of intervals in memory includes an interval search tree, a binary search tree, or a combination thereof and the list in memory includes a priority queue, a sorted array, or a combination thereof.

In some examples of the method, apparatuses, and non-transitory computer-readable medium described herein, the first dimension may be orthogonal to the second dimension.

In some examples of the method, apparatuses, and non-transitory computer-readable medium described herein, the user interface includes a graph for display and the set of objects includes labels on the graph, where the start coordinate for each object in the first dimension, the end coordinate for each object in the first dimension, and an interval for each object in the second dimension correspond to underlying data for the graph, a size of the graph, or a combination thereof.

In some examples of the method, apparatuses, and non-transitory computer-readable medium described herein, the graph includes a line graph, a multi-line chart, a bar chart, a combo-chart, a pie chart, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for displaying a set of objects of a graph in a user interface including the graph, the method comprising:
   storing, in a list in memory for the set of objects, a start coordinate for each object in a first dimension and an end coordinate for each object in the first dimension, wherein the start coordinate and the end coordinate correspond to a default display configuration for each respective object;
   performing a single sweep of values in the first dimension, comprising:
      identifying, based at least in part on the list, a start coordinate in the first dimension for a first object of the set of objects;
      storing an interval in a second dimension corresponding to the start coordinate in the first dimension for the first object;
      identifying, based at least in part on the list, a start coordinate in the first dimension for a second object of the set of objects, wherein the start coordinate in the first dimension for the second object is equal to or follows the start coordinate in the first dimension for the first object and is equal to or precedes an end coordinate in the first dimension for the first object according to the single sweep of values in the first dimension;
      determining an overlap between the stored interval in the second dimension for the first object and an interval in the second dimension corresponding to the start coordinate in the first dimension for the second object;
      modifying the default display configuration for the second object based at least in part on determining the overlap, wherein a modified display configuration for the second object is limited to a modified start coordinate in the first dimension equal to or following the start coordinate in the first dimension for the second object, and wherein modifying the default display configuration for the second object comprises determining a next best display configuration for the second object, wherein the next best display configuration corresponds to the modified display configuration for the second object and comprises a next best start coordinate in the first dimension corresponding to the modified start coordinate, a next best end coordinate in the first dimension, and a next best interval in the second dimension;
      updating the list to include the modified display configuration for the second object, wherein updating the list to include the modified display configuration for the second object comprises replacing, in the list, the start coordinate in the first dimension for the second object with the next best start coordinate in the first dimension for the second object and the end coordinate in the first dimension for the second object with the next best end coordinate in the first dimension for the second object; and
identifying, for the single sweep of values and based at least in part on the updated list, the modified start coordinate for the second object; and
displaying, in the user interface, one or more of the set of objects non-overlapping in the user interface based on performing the single sweep of values.

2. The method of claim 1, wherein performing the single sweep of values comprises:
incrementing a reference value in the first dimension from a last start coordinate or end coordinate for the set of objects to a next start coordinate or end coordinate for the set of objects.

3. The method of claim 1, wherein performing the single sweep of values further comprises:
identifying, based at least in part on the list, the end coordinate in the first dimension for the first object; and
removing from memory the stored interval in the second dimension for the first object based at least in part on identifying the end coordinate.

4. The method of claim 1, wherein performing the single sweep of values further comprises:
identifying, based at least in part on the list, a start coordinate in the first dimension for a third object of the set of objects;
determining that an interval in the second dimension corresponding to the start coordinate in the first dimension for the third object does not overlap with any stored interval in the second dimension for the set of objects; and
storing the interval in the second dimension corresponding to the start coordinate in the first dimension for the third object based at least in part on determining that the interval for the third object does not overlap with any stored interval.

5. The method of claim 1, further comprising:
refraining from displaying the second object in the user interface based at least in part on determining an additional overlap for the modified display configuration for the second object.

6. The method of claim 1, wherein identifying, for the single sweep of values, the modified start coordinate for the second object comprises:
identifying, based at least in part on the list, the next best start coordinate in the first dimension for the second object; and
determining whether the next best interval in the second dimension for the second object overlaps with any stored interval in the second dimension for the set of objects.

7. The method of claim 1, wherein storing the start coordinate for each object in the first dimension and the end coordinate for each object in the first dimension further comprises:
determining a default positioning for each object of the set of objects in the user interface, wherein the start coordinate for each object in the first dimension, the end coordinate for each object in the first dimension, and an interval for each object in the second dimension correspond to the default positioning.

8. The method of claim 7, further comprising:
re-sizing the user interface based at least in part on a user input;
re-calculating the default positioning for each object of the set of objects in the user interface based at least in part on the re-sizing; and
performing the single sweep of values according to the re-calculated default positioning for each object of the set of objects.

9. The method of claim 7, further comprising:
determining a change to the set of objects, the default positioning for at least one object of the set of objects, or a combination thereof;
re-calculating the default positioning for each object of the set of objects in the user interface based at least in part on the change; and
performing the single sweep of values according to the re-calculated default positioning for each object of the set of objects.

10. The method of claim 1, further comprising:
re-sizing the user interface based at least in part on a user input;
performing a worst-case scenario calculation based at least in part on the re-sized user interface and a size of the set of objects; and
determining whether to refrain from displaying all objects of the set of objects in the user interface based at least in part on the worst-case scenario calculation.

11. The method of claim 1, wherein the stored interval in the second dimension for the first object is stored in a set of intervals in memory.

12. The method of claim 11, wherein:
the set of intervals in memory comprises an interval search tree, a binary search tree, or a combination thereof; and
the list comprises a priority queue, a sorted array, or a combination thereof.

13. The method of claim 1, wherein the first dimension is orthogonal to the second dimension.

14. The method of claim 1, wherein:
the set of objects comprises labels on the graph, wherein the start coordinate for each object in the first dimension, the end coordinate for each object in the first dimension, and an interval for each object in the second dimension correspond to underlying data for the graph, a size of the graph, or a combination thereof.

15. The method of claim 14, wherein the graph comprises a line graph, a multi-line chart, a bar chart, a combo-chart, a pie chart, or a combination thereof.

16. An apparatus for displaying a set of objects of a graph in a user interface including the graph, the apparatus comprising:
a processor;
memory in electronic communication with the processor; and
instructions stored in the memory and executable by the processor to cause the apparatus to:
store, in a list in memory for the set of objects, a start coordinate for each object in a first dimension and an end coordinate for each object in the first dimension, wherein the start coordinate and the end coordinate correspond to a default display configuration for each respective object;
perform a single sweep of values in the first dimension, comprising:
identifying, based at least in part on the list, a start coordinate in the first dimension for a first object of the set of objects;
storing an interval in a second dimension corresponding to the start coordinate in the first dimension for the first object;
identifying, based at least in part on the list, a start coordinate in the first dimension for a second object of the set of objects, wherein the start coordinate in the first dimension for the second object is equal to or follows the start coordinate in the first dimensions for the first object and is equal to or precedes an end coordinate in the first dimension for the first object according to the single sweep of values in the first dimension;

determining an overlap between the stored interval in the second dimension for the first object and an interval in the second dimension corresponding to the start coordinate in the first dimension for the second object; and modifying the default display configuration for the second object based at least in part on determining the overlap, wherein a modified display configuration for the second object is limited to a modified start coordinate in the first dimension equal to or following the start coordinate in the first dimension for the second object, and wherein modifying the default display configuration for the second object comprises determining a next best display configuration for the second object, wherein the next best display configuration corresponds to the modified display configuration for the second object and comprises a next best start coordinate in the first dimension corresponding to the modified start coordinate, a next best end coordinate in the first dimension, and a next best interval in the second dimension;

updating the list to include the modified display configuration for the second object, wherein updating the list to include the modified display configuration for the second object comprises replacing, in the list, the start coordinate in the first dimension for the second object with the next best start coordinate in the first dimension for the second object and the end coordinate in the first dimension for the second object with the next best end coordinate in the first dimension for the second object; and identifying, for the single sweep of values and based at least in part on the updated list, the modified start coordinate for the second object; and display, in the user interface, one or more of the set of objects non-overlapping in the user interface based on performing the single sweep of values.

17. A non-transitory computer-readable medium storing code for displaying a set of objects of a graph in a user interface including the graph, the code comprising instructions executable by a processor to:

store, in a list in memory for the set of objects, a start coordinate for each object in a first dimension and an end coordinate for each object in the first dimension, wherein the start coordinate and the end coordinate correspond to a default display configuration for each respective object;

perform a single sweep of values in the first dimension, comprising:

identifying, based at least in part on the list, a start coordinate in the first dimension for a first object of the set of objects;

storing an interval in a second dimension corresponding to the start coordinate in the first dimension for the first object;

identifying, based at least in part on the list, a start coordinate in the first dimension for a second object of the set of objects, wherein the start coordinate in the first dimension for the second object is equal to or follows the start coordinate in the first dimensions for the first object and is equal to or precedes an end coordinate in the first dimension for the first object according to the single sweep of values in the first dimension;

determining an overlap between the stored interval in the second dimension for the first object and an interval in the second dimension corresponding to the start coordinate in the first dimension for the second object; and modifying the default display configuration for the second object based at least in part on determining the overlap, wherein a modified display configuration for the second object is limited to a modified start coordinate in the first dimension equal to or following the start coordinate in the first dimension for the second object, and wherein modifying the default display configuration for the second object comprises determining a next best display configuration for the second object, wherein the next best display configuration corresponds to the modified display configuration for the second object and comprises a next best start coordinate in the first dimension corresponding to the modified start coordinate, a next best end coordinate in the first dimension, and a next best interval in the second dimension;

updating the list to include the modified display configuration for the second object, wherein updating the list to include the modified display configuration for the second object comprises replacing, in the list, the start coordinate in the first dimension for the second object with the next best start coordinate in the first dimension for the second object and the end coordinate in the first dimension for the second object with the next best end coordinate in the first dimension for the second object;

and identifying, for the single sweep of values and based at least in part on the updated list, the modified start coordinate for the second object; and display, in the user interface, one or more of the set of objects non-overlapping in the user interface based on performing the single sweep of values.

18. The method of claim 1, wherein the one or more of the set of objects are displayed non-overlapping in the user interface without performing a sweep of values in the second dimension.

* * * * *